United States Patent
Ozawa et al.

(10) Patent No.: US 10,587,126 B2
(45) Date of Patent: *Mar. 10, 2020

(54) POWER STORAGE DEVICE, POWER STORAGE CONTROL DEVICE, AND POWER STORAGE CONTROL METHOD

(71) Applicant: Sony Corporation, Tokyo (JP)

(72) Inventors: Atsushi Ozawa, Kanagawa (JP); Kazuo Nakamura, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/022,494

(22) PCT Filed: Aug. 12, 2014

(86) PCT No.: PCT/JP2014/071268
§ 371 (c)(1),
(2) Date: Mar. 16, 2016

(87) PCT Pub. No.: WO2015/045661
PCT Pub. Date: Apr. 2, 2015

(65) Prior Publication Data
US 2016/0233697 A1    Aug. 11, 2016

(30) Foreign Application Priority Data
Sep. 26, 2013  (JP) ................... 2013-199746

(51) Int. Cl.
*H02J 7/00* (2006.01)

(52) U.S. Cl.
CPC .................. *H02J 7/0014* (2013.01)

(58) Field of Classification Search
USPC ................................... 320/116–123
See application file for complete search history.

(56) References Cited

U.S. PATENT DOCUMENTS

| 2002/0017893 A1* | 2/2002 | Duff, Jr. ............ H01G 9/155 320/100 |
| 2005/0029987 A1 | 2/2005 | Lin et al. |

(Continued)

FOREIGN PATENT DOCUMENTS

| EP | 2352218 A2 | 8/2011 |
| EP | 2700141 A1 | 2/2014 |

(Continued)

OTHER PUBLICATIONS

Office Action for CN Patent Application No. 201480051605.1, dated Feb. 26, 2018, 06 of Office Action and 06 pages of English Translation.

(Continued)

*Primary Examiner* — Binh C Tat
(74) *Attorney, Agent, or Firm* — Chip Law Group

(57) ABSTRACT

There is provided a power storage device, a power storage control device, and a power storage control method for rapidly equalizing voltages of cells with a simple configuration. A power storage device including a plurality of cells which are connected in series; a plurality of reactance elements which are connected in series; a plurality of connection lines configured to connect the respective cells and the respective reactance elements in parallel in a one-to-one correspondence; a plurality of switching elements configured to independently open and close each of the connection lines; and a power storage control device configured to control the switching elements to cause energy to be transferred between the cells.

13 Claims, 19 Drawing Sheets

(56) References Cited

U.S. PATENT DOCUMENTS

| | | | |
|---|---|---|---|
| 2009/0015199 A1* | 1/2009 | Kitanaka | H02J 7/0029 320/118 |
| 2012/0007435 A1* | 1/2012 | Sada | H02J 17/00 307/84 |
| 2012/0086283 A1* | 4/2012 | Yamamoto | H02J 17/00 307/104 |
| 2012/0194135 A1 | 8/2012 | Mizoguchi | |
| 2013/0026978 A1* | 1/2013 | Cooley | H01M 10/052 320/107 |
| 2013/0093395 A1 | 4/2013 | Liu | |
| 2014/0077604 A1* | 3/2014 | Shibata | H02S 40/38 307/66 |
| 2014/0225433 A1* | 8/2014 | Niizuma | B60L 7/14 307/10.1 |
| 2014/0232344 A1 | 8/2014 | Drobnik | |

FOREIGN PATENT DOCUMENTS

| | | |
|---|---|---|
| JP | 2012-029382 A | 2/2012 |
| JP | 2012-034446 A | 2/2012 |
| JP | 2012-257440 A | 12/2012 |
| JP | 2013-115983 A | 6/2013 |
| TW | I228340 B | 2/2005 |
| WO | 2012/143396 A1 | 10/2012 |

OTHER PUBLICATIONS

Extended European Search Report of EP Patent Application No. 14849715.9, dated Mar. 28, 2017, 6 pages.

Office Action for EP Patent Application No. 14849715.9 dated Oct. 30, 2018, 5 pages of Office Action.

Office Action for EP Patent Application No. 14849715.9, dated Feb. 12, 2019, 08 pages of Office Action.

Office Action for CN Patent Application No. 201480051605.1, dated Dec. 5, 2018, 04 pages of Office Action.

Office Action for CN Patent Application No. 201480051605.1, dated May 21, 2019, 04 pages of Office Action and 07 pages of English Translation.

Office Action for EP Patent Application No. 14849715.9, dated May 13, 2019, 04 pages of Office Action.

Office Action for CN Patent Application No. 201480051605.1, dated Nov. 13, 2019, 05 pages of Office Action and 08 pages of English Translation.

* cited by examiner

POWER STORAGE DEVICE, POWER STORAGE CONTROL DEVICE, AND POWER STORAGE CONTROL METHOD

TECHNICAL FIELD

The present disclosure relates to a power storage device, a power storage control device, and a power storage control method. More specifically, the present disclosure relates to a power storage device, a power storage control device, and a power storage control method for storing electricity in a cell.

BACKGROUND ART

Technologies of equalizing voltages of a plurality of cells which are connected in series have been proposed in the related art. Patent Literature 1, for example, proposes a voltage equalization circuit provided with a first series circuit configured with n power storage cells that are connected in series, second and third series circuits configured with n–1 power storage cells that are connected in series, and first and second switch groups.

CITATION LIST

Patent Literature

Patent Literature: JP 2012-257440A

SUMMARY OF INVENTION

Technical Problem

Such a configuration for equalizing voltages of a plurality of cells that are connected in series is simple and desirable for rapidly equalizing voltages of each of the cells.

The present disclosure provides a power storage device, a power storage control device, and a power storage control method for rapidly equalizing voltages of cells with a simple configuration.

Solution to Problem

According to the present disclosure, a power storage device includes: a plurality of cells which are connected in series; a plurality of reactance elements which are connected in series; a plurality of connection lines configured to connect the respective cells and the respective reactance elements in parallel in a one-to-one correspondence; a plurality of switching elements configured to independently open and close each of the connection lines; and a power storage control device configured to control the switching elements to cause energy to be transferred between the cells.

The power storage control device may close a first pair of connection lines which are disposed at both ends of a series of cells among the plurality of cells, and then open the first pair of connection lines and close a second pair of connection lines which are disposed at both ends of a target cell among the series of cells.

In this case, the power storage control device may select all or some of the plurality of cells as the series of cells and select a plurality of target cells.

Alternatively, each of the reactance elements may have a same constant. In this case, each of the reactance elements may include a capacitor. In this case, each of the reactance elements may include a reactor. In this case, the power storage control device may switch connection of the reactance elements and the cells at a resonance frequency of the reactance elements.

A resonance frequency of the reactance elements may be a frequency when an imaginary number component in a Cole-Cole plot of internal impedances of the cells measured using an AC impedance method is 0.

The number of switching elements and the number of connection lines may be a number obtained by adding 1 to the number of cells.

The power storage control device may select the target cell and then to close the first pair of connection lines. In this case, the power storage control device may select the target cell including a cell having a minimum voltage.

According to the present disclosure, a power storage control device configured to control a plurality of switching elements to independently open and close a plurality of connection lines which connect a plurality of cells connected in series and a plurality of reactance elements connected in series in parallel in a one-to-one correspondence to cause energy to be transferred between the cells.

According to the present disclosure, a power storage control method of a control device is a method for controlling a plurality of switching elements to independently open and close a plurality of connection lines which connect a plurality of cells connected in series and a plurality of reactance elements connected in series in parallel in a one-to-one correspondence to cause energy to be transferred between the cells.

Advantageous Effects of Invention

According to the present disclosure, voltages of cells can be rapidly equalized with a simple configuration.

DESCRIPTION OF EMBODIMENTS

Figure 1:
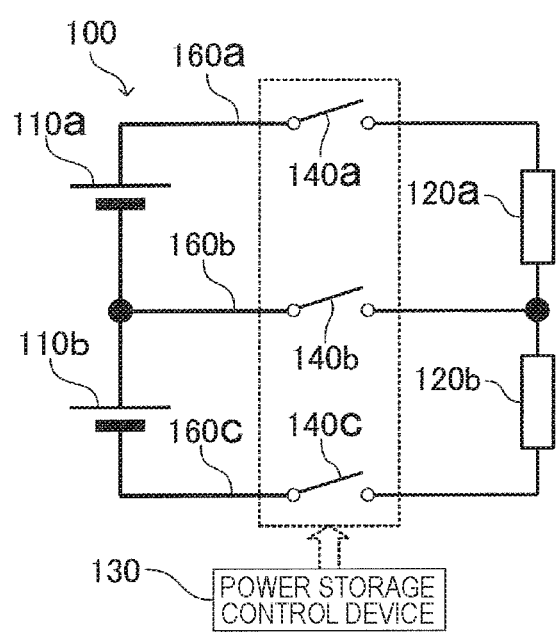
FIG. 1 is a diagram schematically showing a configuration example of a power storage device of a first embodiment of the present disclosure.

Hereinafter, exemplary embodiments for implementing the present disclosure will be described with reference to the drawings. The plurality of embodiments described below are for showing representative examples of the embodiments of the present disclosure, and the scope of the present disclosure should not be narrowly interpreted according to them. In addition, in each of the embodiments, the same reference numerals are given to constituent elements corresponding to each other to omit overlapping description. Description will be provided in the following order.

1. First embodiment
(Example of a power storage device having a plurality of connection lines which connect a plurality of serially connected cells and a plurality of reactance elements in a one-to-one correspondence)
2. First modified example of the first embodiment
(Example of a power storage device having a higher number of serially connected cells)
3. Second embodiment
(Example of a power storage device which supplies energy from a series of cells to a target cell via reactance elements)
4. First modified example of the second embodiment
(Example of a power storage device which selects all cells as a series of cells and selects a plurality of target cells)
5. Second modified example of the second embodiment
(Example of a power storage device which selects some cells as a series of cells and selects a plurality of target cells)
6. Third embodiment
(Example of a power storage device in which a target cell is selected and then a first pair of connection lines are closed)
7. First modified example of the third embodiment
(Example of a power storage device which includes a cell having a minimum voltage in target cells)
8. Fourth embodiment
(Example of a power storage device in which reactance elements are capacitors)
9. First modified example of the fourth embodiment
(Example of a power storage device in which constants of respective reactance elements are the same)
10. Fifth embodiment
(Example of a power storage device in which reactance elements are reactors and capacitors connected in series)
11. First modified example of the fifth embodiment
(Example of a power storage device in which connection of a cell and a reactance element is switched at a resonance frequency of a reactance element)
12. Second modified example of the fifth embodiment
(Example of a power storage device to which cells with a substantially flat discharge characteristic are applied)
13. Sixth embodiment
(Example of a power storage device in which a reactance element has a resonance frequency adaptive to a Cole-Cole plot)
14. First modified example of the sixth embodiment
(Example of a power storage device for which a resonance frequency of a DC resonance circuit is set considering a Cole-Cole plot of each charge rate)

1. First Embodiment

[Device Configuration Example]

FIG. 1 is an overall diagram schematically showing a configuration example of a power storage device 100 of the present embodiment. As shown in FIG. 1, the power storage device 100 includes a plurality of cells 110*a* and 110*b*, a plurality of reactance elements 120*a* and 120*b*, a plurality of connection lines 160*a*, 160*b*, and 160*c*, a plurality of switching elements 140*a*, 140*b*, and 140*c*, and a power storage control device 130. The number of reactance elements 120*a* and 120*b* is the same as that of the cells 110*a* and 110*b*. The number of switching elements 140*a* to 140*c* is the same as that of the connection lines 160*a* to 160*c*.

[Cells 110*a* and 110*b*]

The cells 110*a* and 110*b* are connected in series as shown in FIG. 1. All the cells 110*a* and 110*b* can be charged and discharged. In other words, each of the cells 110*a* and 110*b* can accumulate a charge current supplied from a charge device which is not illustrated as electric charge during charge, and can supply accumulated electric charge to a load which is not illustrated as a discharge current during discharge. Here, a cell in an i-th position (here, i is a value from 1 to the total number of cells) counted from the end of the positive electrode side of the entire cells, i.e., from the positive electrode terminal, is defined as an i-th cell. In the example of FIG. 1, both of the cells 110*a* and 110*b* are connected in series by connecting the negative electrode of the first cell 110*a* to the positive electrode of the second cell 110*b*.

The number of cells 110*a* and 110*b* is not limited to two as shown in FIG. 1 as long as they are plural. The cells 110*a* and 110*b* may be configured according to the same standard or different standards. The cells 110*a* and 110*b* may each be single cells or battery packs. When the cells 110*a* and 110*b* are battery packs, connection inside the battery packs may be made in series, in parallel, or both.

[Reactance Elements 120*a* and 120*b*]

The reactance elements 120*a* and 120*b* are connected in series as shown in FIG. 1. The reactance elements 120*a* and 120*b* may have capacitive reactance, inductive reactance, or both. Reactance elements 120*a* and 120*b* having a resistive component are not excluded. Here, a cell in a j-th position (here, j is a value from 1 to the total number of reactance elements) counted from the end of the positive electrode side of the entire reactance elements is defined as a j-th reactance element. In the example of FIG. 1, both of the reactance elements 120*a* and 120*b* are connected in series by connecting the negative electrode of the first reactance element 120*a* to the positive electrode of the second reactance element 120*b*.

[Connection Lines 160*a* to 160*c*]

The connection lines 160*a* to 160*c* connect the cells 110*a* and 110*b* and the reactance elements 120*a* and 120*b* in parallel in a one-to-one correspondence. Here, a connection line in a k-th position (here, k is a value from 1 to the total number of connection lines) counted from the positive electrode side is defined as a k-th connection line.

As shown in FIG. 1, the end of the first connection line 160*a* on the cell side is connected to the positive electrode of the first cell 110*a*, and the end thereof on the reactance element side is connected to the end of the first reactance element 120*a* on the positive electrode side. The end of the second connection line 160*b* on the cell side is connected to the negative electrode of the first cell 110*a*, and the end thereof on the reactance element side is connected to the end of the first reactance element 120*a* on the negative electrode side. In other words, the first cell 110*a* and the first reactance element 120*a* corresponding thereto are connected in parallel in a one-to-one correspondence by the pair of connection lines 160*a* and 160*b*.

In addition, the end of the second connection line 160*b* on the cell side is connected to the positive electrode of the second cell 110*b*, and the end thereof on the reactance element side is connected to the end of the second reactance element 120*b* on the positive electrode side. The end of the third connection line 160*c* on the cell side is connected to the negative electrode of the second cell 110*b*, and the end thereof on the reactance element side is connected to the end of the second reactance element 120*b* on the negative electrode side. In other words, the second cell 110*b* and the second reactance element 120*b* corresponding thereto are connected in parallel in a one-to-one correspondence by the pair of connection lines 160*b* and 160*c*.

[Switching Elements 140*a* to 140*c*]

As shown in FIG. 1, each of the switching elements 140*a* to 140*c* is disposed on each of the connection lines 160*a* to 160*c* corresponding to each of the switching elements 140*a* to 140*c*. When each of the switching elements 140*a* to 140*c* is in an off state or an on state, the corresponding connection lines 160*a* to 160*c* are opened or closed, i.e., become disconnected or connected. Opening and closing of each of the corresponding connection lines 160*a* to 160*c* are performed independently from each of the switching elements 140*a* to 140*c*. Here, a switching element in a k-th position counted from the positive electrode side is defined as a k-th switching element.

A form of the switching elements 140*a* to 140*c* is not limited, and the switching elements 140*a* to 140*c* may be configured with, for example, semiconductor elements, or the like. Such a semiconductor element may be a transistor or the like. The transistor may be a field-effect transistor or the like. The field-effect transistor may be a metal-oxide-semiconductor field-effect transistor (MOSFET) or the like. By employing the field-effect transistor, power consumption can be suppressed.

[Power Storage Control Device 130]

The power storage control device 130 controls operations of each of the switching elements 140*a* to 140*c* to cause energy to be transferred between the cells 110*a* and 110*b*. In FIG. 1, the configuration in which the power storage control device 130 controls operations of the switching elements 140*a* to 140*c* is indicated by the dotted-line frame surrounding the switching elements 140*a* to 140*c* and the dotted-line arrow pointing to the dotted-line frame from the power storage control device 130. The power storage control device 130 may control operations of each of the switching elements 140*a* to 140*c* by outputting control signals to each of the switching elements 140*a* to 140*c*. The control signals may include a gate voltage of the field-effect transistor or the like.

The power storage control device 130 may be configured with an electronic device or the like. In this case, the electronic device may include an arithmetic processing device such as a central processing unit (CPU) or a microprocessing unit (MPU), a storage device such as a random access memory (RAM) or a read only memory (ROM). The ROM may store a program for realizing a function of the power storage control device 130, i.e., a program for causing a computer to function as the power storage control device 130. In addition, the ROM may store data that the arithmetic processing device refers to when executing the program. By executing the program stored in the ROM, the arithmetic processing device may realize the function of the power storage control device 130. The RAM may be used as a work area of the arithmetic processing device or the like. The above constituent elements, however, are not limited to the above configurations.

[Device Operation Example]

An operation example of the power storage device 100 will be described below. The operation example below includes an embodiment of the power storage control method according to the present disclosure. The power storage control method according to the present disclosure, however, may be realized with a configuration other than that of the power storage device 100.

Figure 2:
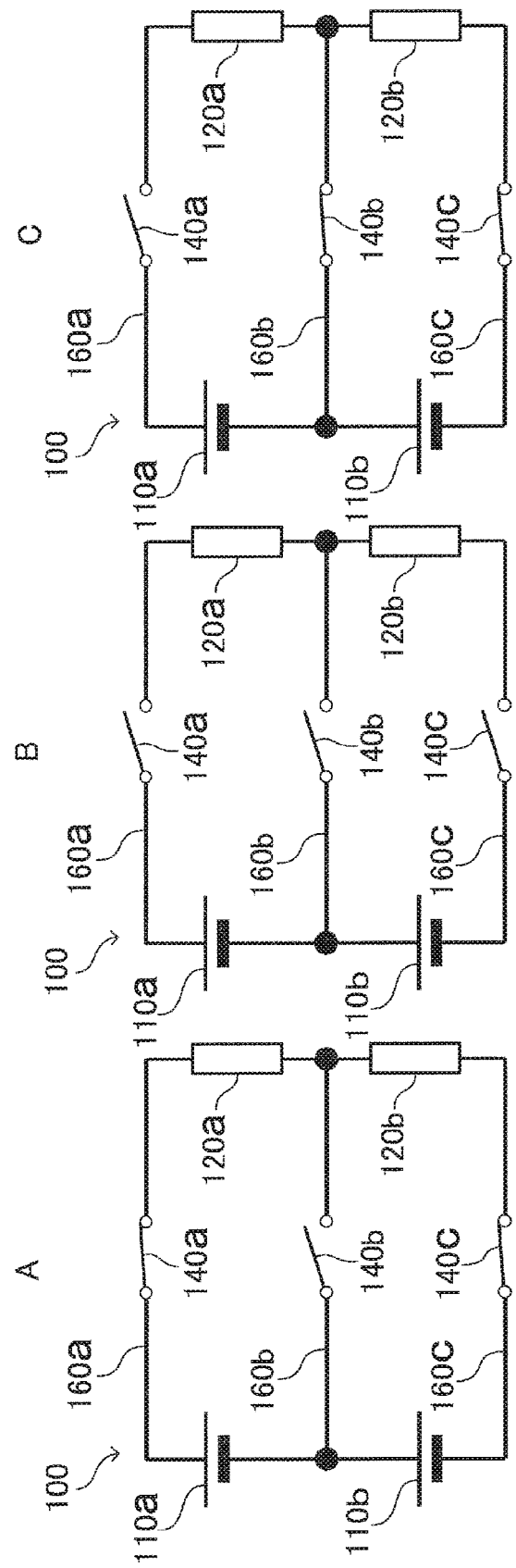
FIG. 2 is a diagram schematically showing an operation example of the power storage device of the first embodiment of the present disclosure, in which A shows a first control state of switching elements, B shows a second control state of the switching elements, and C shows a third control state of the switching elements.

In the present embodiment, when the power storage control device 130 controls the switching elements 140*a* to 140*c* as shown in FIGS. 2A to 2C, energy is transferred between the cells 110*a* and 110*b*.

Specifically, FIG. 2A shows a first control state of the switching elements 140*a* to 140*c*. In the first control state, the first switching element 140*a* and the third switching element 140*c* are controlled to be in an on state, and the second switching 140b is controlled to be in an off state. In other words, in the first control state, the first connection line 160a and the third connection line 160c are closed, i.e., are in a connected state, and the second connection line 160b is opened, i.e., is in a disconnected state. Accordingly, all the cells 110a and 110b, i.e., the serially connected cell group, and all the reactance elements 120a and 120b, i.e., the serially connected reactance element group, are connected in parallel via the connection lines 160a and 160c that are in a closed state. In the first control state described above, energy moves from all the cells 110a and 110b to all the reactance elements 120a and 120b, and the moved energy is accumulated in each of the reactance elements 120a and 120b.

FIG. 2B shows a second control state of the switching elements 140a to 140c. In the second control state, all the switching elements 140a to 140c are controlled to be in an off state. The difference from the first control state is that the first switching element 140a and the third switching element 140c that were in the on state in the first control state are switched to the off state. In other words, in the second control state, all the connection lines 160a to 160c are opened. Accordingly, in the second control state, all the cells 110a and 110b and all the reactance elements 120a and 120b are disconnected. The energy accumulated in each of the reactance elements 120a and 120b in the first control state remains accumulated in each of the reactance elements 120a and 120b in the second control state.

FIG. 2C shows a third control state of the switching elements 140a to 140c. In the third control state, the second switching element 140b and the third switching element 140c are controlled to be in an on state, and the first switching element 140a is controlled to be in an off state. The difference from the second control state is that the second switching element 140b and the third switching element 140c that were in the off state in the second control state are switched to the on state. In other words, in the third control state, the second connection line 160b and the third connection line 160c are closed, and the first connection line 160a is opened. Accordingly, the second cell 110b and the second reactance element 120b are connected in parallel in the third control state. The energy accumulated in the second reactance element 120b moves to the second cell 110b in the third control state. At this time, there is no change in the energy accumulated in the first reactance element 120a.

In summary, in FIGS. 2A to 2C, after energy moves from all the cells 110a and 110b to all the reactance elements 120a and 120b, the energy moves from the second reactance element 120b to the second cell 110b. In other words, after the energy of all of the cells 110a and 110b is distributed to the reactance elements 120a and 120b, energy is supplied from the second reactance element 120b to the second cell 110b that has less retained energy than the first cell 110a. After the supply of energy, unevenness in energy between the cells 110a and 110b decreases or is resolved. The above operation, however, is merely an example, and does not limit the scope of the present disclosure. For example, even when energy retained by the second cell 110b is greater than energy retained by the first cell 110a, the power storage device 100 can operate effectively.

According to the present embodiment, energy can be transferred between the cells 110a and 110b by opening and closing the connection lines 160a to 160c which connect the cells and the reactance elements 120a and 120b in parallel in a one-to-one correspondence independently from each other using the switching elements 140a to 140c. According to the present embodiment, all energy of a cell retaining a large amount of energy and a cell retaining a small amount of energy can be distributed to a plurality of reactance elements and the distributed energy can be supplied to the cell retaining the small amount of energy. Accordingly, it is possible to rapidly perform a voltage equalizing process, i.e., an active cell balancing process, with a simple configuration. It should be noted that there are cases in which a voltage equalizing process becomes slow in a configuration specifically for transfer of energy between adjacent cells, in particular, when there are a large number of cells; however, according to the present disclosure, that problem can be prevented. In addition, according to the present disclosure, based on the idea that energy of all of a plurality of cells is distributed to a plurality of reactance elements and the distributed energy is supplied to a target cell, a rapid voltage equalizing process can be realized with a low-cost circuit configuration that has a reduced number of switching elements.

2. First Modified Example of the First Embodiment

[Device Configuration Example]

Figure 3:
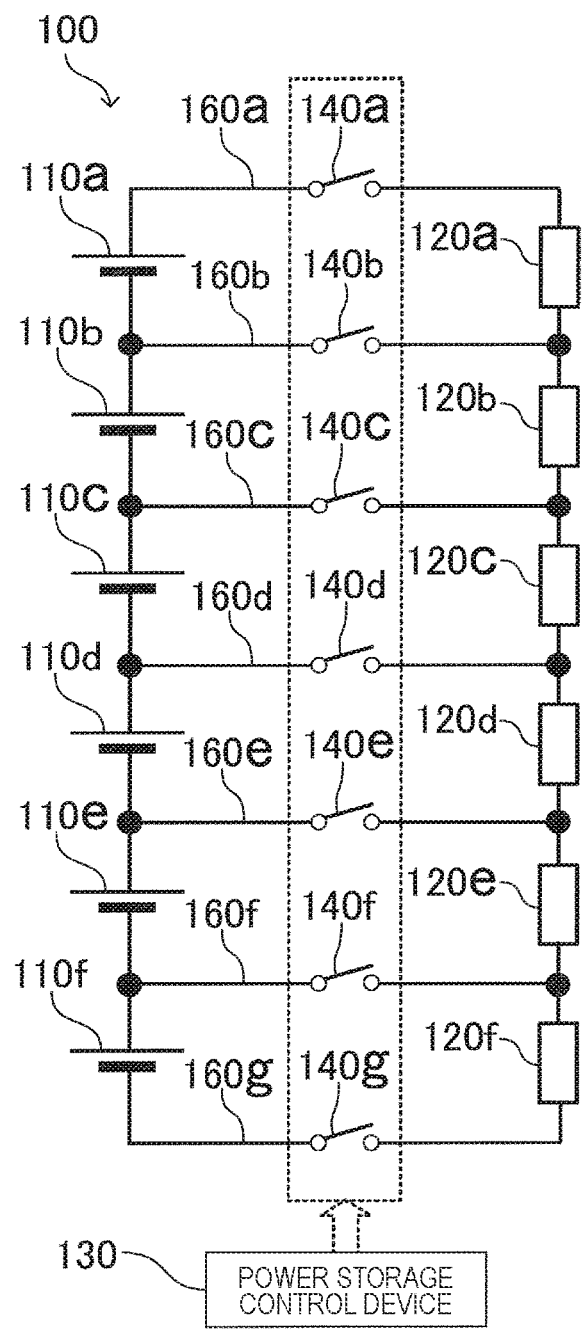
FIG. 3 is a diagram schematically showing a configuration of a power storage device according to a first modified example of the first embodiment of the present disclosure.

FIG. 3 is an overall diagram schematically showing a configuration of a power storage device 100 according to a first modified example of the present embodiment. The power storage device 100 of the present modified example has different numbers of cells, reactance elements, connection lines, and switching elements from the power storage device 100 of FIG. 1. The difference will be described in detail below.

[Cells 110a to 110f]

The power storage device 100 of the present modified example includes a third cell 110c, a fourth cell 110d, a fifth cell 110e, and a sixth cell 110f in addition to the first and second cells 110a and 110b. The cells 110a to 110f are connected in series in numerical order.

[Reactance Elements 120a to 120f]

The power storage device 100 of the present modified example includes a third reactance element 120c, a fourth reactance element 120d, a fifth reactance element 120e, and a sixth reactance element 120f, in addition to the first and second reactance elements 120a and 120b. The reactance elements 120a to 120f are connected in series in numerical order.

[Connection lines 160a to 160g]

The power storage device 100 of the present modified example includes a fourth connection line 160d, a fifth connection line 160e, a sixth connection line 160f, and a seventh connection line 160g, in addition to the first to third connection lines 160a to 160c.

The end of the third connection line 160c on the cell side is connected to the positive electrode of the third cell 110c, and the end thereof on the reactance element side is connected to the end of the third reactance element 120c on the positive electrode side. The end of the fourth connection line 160d on the cell side is connected to the negative electrode of the third cell 110c, and the end thereof on the reactance element side is connected to the end of the third reactance element 120c on the negative electrode side. In other words, the third cell 110c and the third reactance element 120c corresponding thereto are connected to each other in parallel in a one-to-one correspondence by the pair of connection lines 160c and 160d.

The end of the fourth connection line 160d on the cell side is connected to the positive electrode of the fourth cell 110d, and the end thereof on the reactance element side is connected to the end of the fourth reactance element 120d on the positive electrode side. The end of the fifth connection line 160e on the cell side is connected to the negative electrode of the fourth cell 110d, and the end thereof on the reactance element side is connected to the end of the fourth reactance element 120d on the negative electrode side. In other words, the fourth cell 110d and the fourth reactance element 120d corresponding thereto are connected to each other in parallel in a one-to-one correspondence by the pair of connection lines 160d and 160e.

The end of the fifth connection line 160e on the cell side is connected to the positive electrode of the fifth cell 110e, and the end thereof on the reactance element side is connected to the end of the fifth reactance element 120e on the positive electrode side. The end of the sixth connection line 160f on the cell side is connected to the negative electrode of the fifth cell 110e, and the end thereof on the reactance element side is connected to the end of the fifth reactance element 120e on the negative electrode side. In other words, the fifth cell 110e and the fifth reactance element 120e corresponding thereto are connected to each other in parallel in a one-to-one correspondence by the pair of connection lines 160e and 160f.

The end of the sixth connection line 160f on the cell side is connected to the positive electrode of the sixth cell 110f, and the end thereof on the reactance element side is connected to the end of the sixth reactance element 120f on the positive electrode side. The end of the seventh connection line 160g on the cell side is connected to the negative electrode of the sixth cell 110f, and the end thereof on the reactance element side is connected to the end of the sixth reactance element 120f on the negative electrode side. In other words, the sixth cell 110f and the sixth reactance element 120f corresponding thereto are connected to each other in parallel in a one-to-one correspondence by the pair of connection lines 160f and 160g.

[Switching elements 140a to 140g]

The power storage device 100 of the present modified example includes a fourth switching element 140d, a fifth switching element 140e, a sixth switching element 140f, and a seventh switching element 140g, in addition to the first to third switching elements 140a to 140c.

The fourth switching element 140d is disposed on the fourth connection line 160d, and causes the fourth connection line 160d to be opened or closed when the element is in an off state or an on state. The fifth switching element 140e is disposed on the fifth connection line 160e, and causes the fifth connection line 160e to be opened or closed when the element is in an off state or an on state. The sixth switching element 140f is disposed on the sixth connection line 160f, and causes the sixth connection line 160f to be opened or closed when the element is in an off state or an on state. The seventh switching element 140g is disposed on the seventh connection line 160g, and causes the seventh connection line 160g to be opened or closed when the element is in an off state or an on state.

[Power Storage Control Device 130]

The power storage control device 130 controls operations of the switching elements 140a to 140g to cause energy to be transferred between the cells 110a to 110f. The power storage control device 130 may control operations of the switching elements 140a to 140g by outputting control signals to the switching elements 140a to 140g.

[Device Operation Example]

An operation example of the power storage device 100 according to the present modified example will be described below. The operation example below includes an embodiment of the power storage control method according to the present disclosure.

Figure 4:
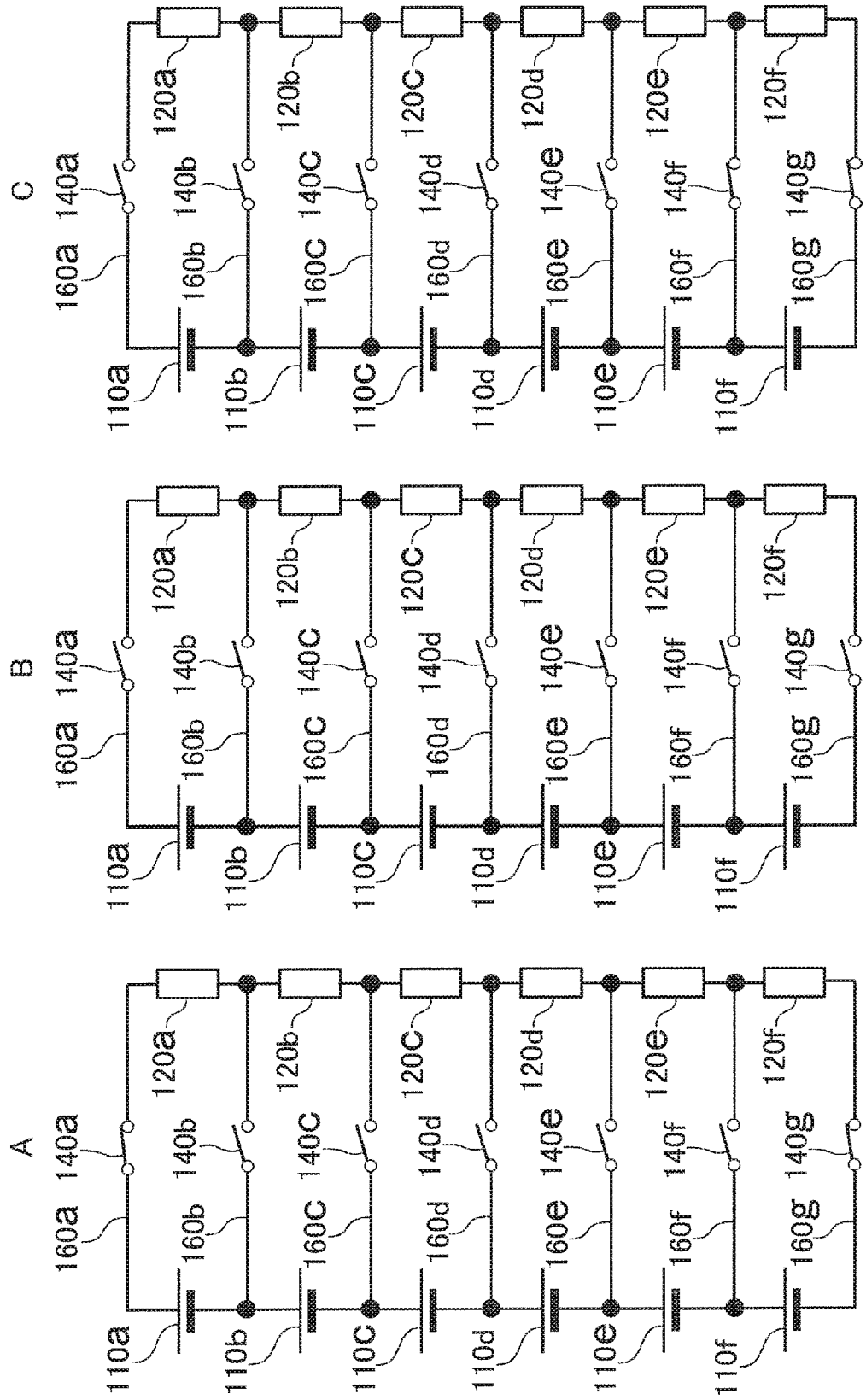
FIG. 4 is a diagram schematically showing an operation example of the power storage device according to the first modified example of the first embodiment of the present disclosure, in which A shows a first control state of the switching elements, B shows a second control state of the switching elements, and C shows a third control state of the switching elements.

In the present modified example, energy is transferred between the cells 110a to 110f when the power storage control device 130 controls the switching elements 140a to 140g as shown in FIGS. 4A to 4C.

Specifically, FIG. 4A shows a first control state of the switching elements 140a to 140g. In the first control state, the first switching element 140a and the seventh switching element 140g are controlled to be in an on state, and the second to sixth switching elements 140b to 140f are controlled to be in an off state. In other words, in the first control state, the first connection line 160a and the seventh connection line 160g are closed, and the second to sixth connection lines 160b to 160f are opened. Accordingly, in the first control state, all the cells 110a to 110f and all the reactance elements 120a to 120f are connected in parallel via the connection lines 160a and 160g in the closed state. In the first control state, energy moves from all the cells 110a to 110f to all the reactance elements 120a to 120f, and the moved energy is accumulated in each of the reactance elements 120a to 120f.

FIG. 4B shows a second control state of the switching elements 140a to 140g. In the second control state, all the switching elements 140a to 140g are controlled to be in an off state. The difference from the first control state is that the first switching element 140a and the seventh switching element 140g that were in the on state in the first control state are switched to the off state. In other words, in the second control state, all the connection lines 160a to 160g are opened. Accordingly, all the cells 110a to 110f and all the reactance elements 120a to 120f are disconnected in the second control state. The energy accumulated in the each of the reactance elements 120a to 120f in the first control state remains accumulated in each of the reactance elements 120a to 120f in the second control state.

FIG. 4C shows a third control state of the switching elements 140a to 140g. In the third control state, the sixth switching element 140f and the seventh switching element 140g are controlled to be in an on state, and the first to fifth switching elements 140a to 140e are controlled to be in an off state. The difference from the second control state is that the sixth switching element 140f and the seventh switching element 140g that were in the off state in the second control state are switched to the on state. In other words, in the third control state, the sixth connection line 160f and the seventh connection line 160g are closed, and the first to fifth connection lines 160a to 160e are opened. Accordingly, the sixth cell 110f and the sixth reactance element 120f are connected in parallel in the third control state. The energy accumulated in the sixth reactance element 120f moves to the sixth cell 110f in the third control state.

In summary, in the present modified example, after energy moves from all the cells 110a to 110f to all the reactance elements 120a to 120f, energy moves from the sixth reactance element 120f to the sixth cell 110f. In other words, after energy of the entire cells 110a to 110f is distributed to the reactance elements 120a to 120f, the energy distributed to the sixth reactance element 120f is supplied to the sixth cell 110f retaining a relatively small amount of energy. The above operation, however, is merely an example, and does not limit the scope of the present disclosure. For example, the power storage device 100 can operate effectively even when a cell other than the sixth cell 110f retains a relatively small amount of energy.

According to the present modified example, the same effect as that of the power storage device 100 of FIG. 1 can be exhibited, and the voltage equalizing process between cells in multiple series can be rapidly performed with a simple configuration, or a degree of freedom of an aspect of the voltage equalizing process can be improved.

3. Second Embodiment

[Device Configuration Example]

The power storage device 100 according to the present embodiment has specified control content of the power storage control device 130 in comparison to the power storage device 100 of FIGS. 1 and 3.

Specifically, the power storage control device 130 of the present embodiment is configured to close a first pair of connection lines disposed at both ends of a series of cells among a plurality of cells. Here, the series of cells is not limited to all the cells as long as they are two or more consecutive cells. Thus, the first pair of connection lines is not limited to the connection lines 160a and 160g at both ends shown in FIG. 4A. In addition, the power storage control device 130 of the present embodiment is configured to close the first pair of connection lines, and then open the first pair of connection lines and close a second pair of connection lines disposed at both ends of a target cell among the series of cells. The target cell is a cell that receives energy, i.e., a cell to which power is supplied. By controlling the switching elements disposed on each of the first pair of connection lines, the power storage control device 130 opens and closes the first pair of connection lines. By controlling the switching elements disposed on each of the second pair of connection lines, the power storage control device 130 opens and closes the second pair of connection lines.

The power storage control device 130 may select the series of cells according to a pre-set criterion for selection. In order to ensure effectiveness of energy supply to a target cell, it is desirable for the series of cells to include a cell with a higher voltage than the target cell. The power storage control device 130 can perform a more efficient voltage equalizing process if the device selects a series of cells including a cell with a maximum voltage among all the cells. The power storage control device 130 may record the result of selection of the series of cells in association with identification information of the cells, for example, numbers of the cells or the like, in a storage area of the power storage control device 130.

When closing the first pair of connection lines, the power storage control device 130 may decide switching elements to be switched to the on state based on, for example, information indicating the correspondence between the cells and the switching elements stored in the storage area in advance and the result of selection of the series of cells. The correspondence between the cells and the switching elements may be the relation between the cells and the switching elements connected to the positive electrodes and the negative electrodes of the cells. In addition, the information indicating the correspondence between the cells and the switching elements may be information obtained by linking the identification information of the cells to identification information of the switching elements corresponding to the cells.

A target cell may be a cell selected according to a criterion for selection. When closing the second pair of connection lines, the power storage control device 130 may decide switching elements to be switched to the on state based on, for example, the correspondence between the cells and the switching elements stored in the storage area in advance and identification information of the target cell.

[Device Operation Example]

Figure 5:
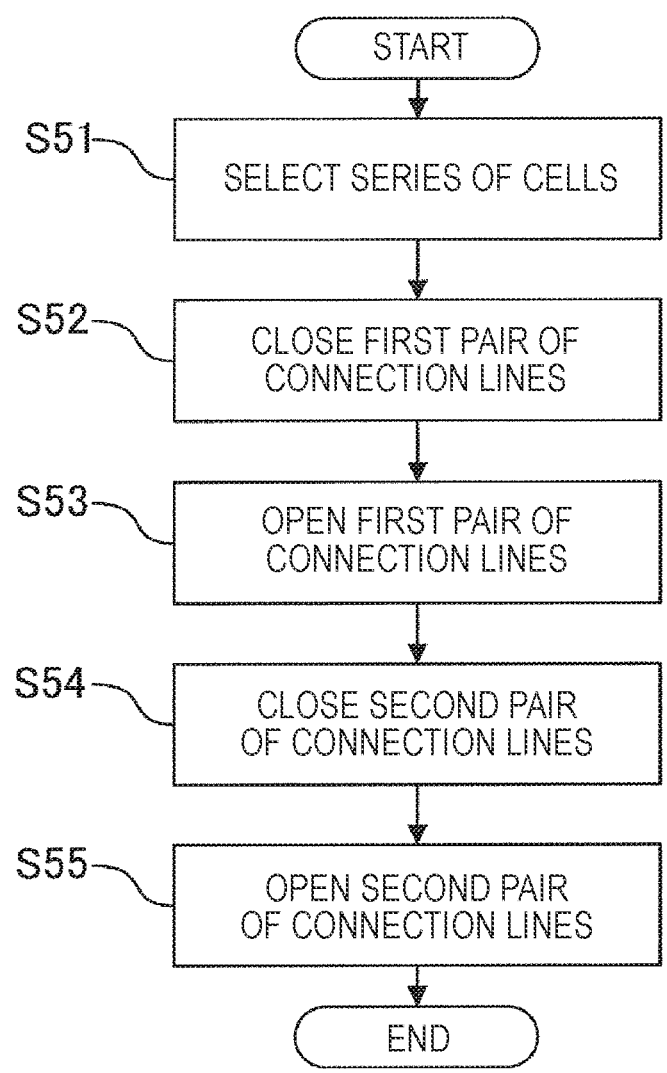
FIG. 5 is a flowchart showing an operation example of a power storage device of a second embodiment of the present disclosure.

FIG. 5 is a flowchart showing an operation example of the power storage device 100 of the present embodiment. The operation example of FIG. 5 includes an embodiment of the power storage control method according to the present disclosure.

For the sake of convenience in description, in the initial state of FIG. 5, all the switching elements are set in the off state, i.e., all the connection lines are set in the open state, so that all the cells are disconnected from the reactance elements.

Then, first in Step 51 (S51) of FIG. 5 from the initial state, a series of cells is selected by the power storage control device 130.

Next, in Step 52 (S52), the power storage control device 130 closes the first pair of connection lines corresponding to the series of cells selected in Step 51 (S51) by switching the switching elements corresponding to the first pair to the on state.

Through Step 52 (S52), the series of cells is connected in parallel to a series of reactance elements corresponding to the series of cells via the first pair of closed connection lines. Then, a current flows from the series of cells to the series of reactance elements, and thus energy moves from the series of cells to the series of reactance elements. The moved energy is accumulated in each of the reactance elements according to constants of the reactance elements.

Next, in Step 53 (S53), the power storage control device 130 opens the first pair of connection lines closed in Step 52 (S52) by switching the switching elements corresponding to the first pair to the off state. At this time, the energy accumulated in the series of reactance elements in Step 52 (S52) remains accumulated in each of the reactance elements.

Next, in Step 54 (S54), the power storage control device 130 closes the second pair of connection lines corresponding to a target cell among the series of cells by switching the switching elements corresponding to the second pair to the on state.

Through Step 54 (S54), only the target cell is connected in parallel to the reactance element corresponding to the target cell via the second pair of closed connection lines. Then, a current flows to the target cell from the reactance element corresponding to the target cell and thus energy moves.

Next, in Step 55 (S55), the power storage control device 130 opens the second pair of connection lines closed in Step 54 (S54) by switching the switching elements corresponding to the second pair to the off state. Then, the voltage equalizing process ends, or the process returns to Step 51 (S51) or Step 52 (S52) if necessary.

According to the power storage device 100 of the present embodiment, after energy is transferred to a group of reactance elements corresponding to a series of cells and distributed to each of the reactance elements, a target cell can receive the energy distributed to the corresponding reactance element therefrom. Accordingly, a rapid voltage equalizing process is possible through simple opening and closing operations of the connection lines.

4. First Modified Example of the Second Embodiment

[Device Configuration Example]

A power storage device 100 of the present modified example has specified content of control of the power storage control device 130 in comparison to the power storage device 100 described in FIG. 5.

Specifically, the power storage control device 130 of the present modified example has a configuration in which all cells are selected as a series of cells and a plurality of target cells are selected. In other words, the power storage control device 130 of the present modified example is configured to cause energy to move from all the cells to all the reactance elements, then open a first pair of connection lines, and then close a plurality of second pairs of connection lines. The plurality of target cells may have a positional relation in which they are adjacent to each other, a positional relation in which they are apart from each other, or target cells in both positional relations may be mixed.

[Device Operation Example]

An operation example of the power storage device 100 of the present modified example will be described below. The operation example below includes an embodiment of the power storage control method according to the present disclosure.

In the present modified example, energy is transferred between a series of cells and a plurality of target cells when the power storage control device 130 controls the switching elements 140a to 140g to open and close the connection lines 160a to 160g as shown in FIGS. 6A to 6C.

Specifically, FIG. 6A shows the first pair of connection lines in the closed state. More specifically, the state of FIG. 6A is a state in which the pair, i.e., the group of the first connection line 160a and the seventh connection line 160g, are closed as the first pair of connection lines. In the state of FIG. 6A, energy moves from the first to sixth cells 110a to 110f to the first to sixth reactance elements 120a to 120f, and the moved energy is accumulated in each of the reactance elements 120a to 120f.

FIG. 6B shows an open state of the first pair of connection lines that were closed in FIG. 6A. The energy accumulated in each of the reactance elements 120a to 120f in the state of FIG. 6A remains accumulated in each of the reactance elements 120a to 120f in the state of FIG. 6B.

FIG. 6C shows a closed state of the second pairs of connection lines. The state of FIG. 6C is a state in which the pair of the second connection line 160b and the third connection line 160c are closed as a second pair of connection lines. In addition, the state of FIG. 6C is a state in which the pair of the fifth connection line 160e and the seventh connection line 160g are also closed as another second pair of connection lines. In the state of FIG. 6C, energy accumulated in the second reactance element 120b moves to the second cell 110b. In addition, in the state of FIG. 6C, energy accumulated in the fifth and sixth reactance elements 120e and 120f moves to the fifth and sixth cells 110e and 110f.

However, the above-described operation is merely an aspect of the present modified example, and does not limit the scope of the present modified example. For example, the power storage device 100 can operate effectively even when a plurality of cells other than the second, fifth, and sixth cells 110b, 110e and 110f are target cells.

When the first pair of connection lines and the second pairs of connection line share no connection line, or the like, the power storage control device 130 may perform opening of the first pair of connection lines and closing of the second pairs of connection lines at the same time. When the first pair of connection lines and the second pairs of connection lines share a connection line, the shared connection line may be kept in the closed state without going through an open state.

According to the power storage device 100 of the present modified example, the same effect as that of the power storage device 100 described in FIG. 5 can be exhibited, or a flexible voltage equalizing process with eased restriction on positions and the number of target cells is possible. Alternatively, according to the power storage device 100 of the present modified example, energy can move to a plurality of target cells at the same time, and thus rapidity of the voltage equalizing process can be effectively secured.

5. Second Modified Example of the Second Embodiment

[Device Configuration Example]

Figure 6:
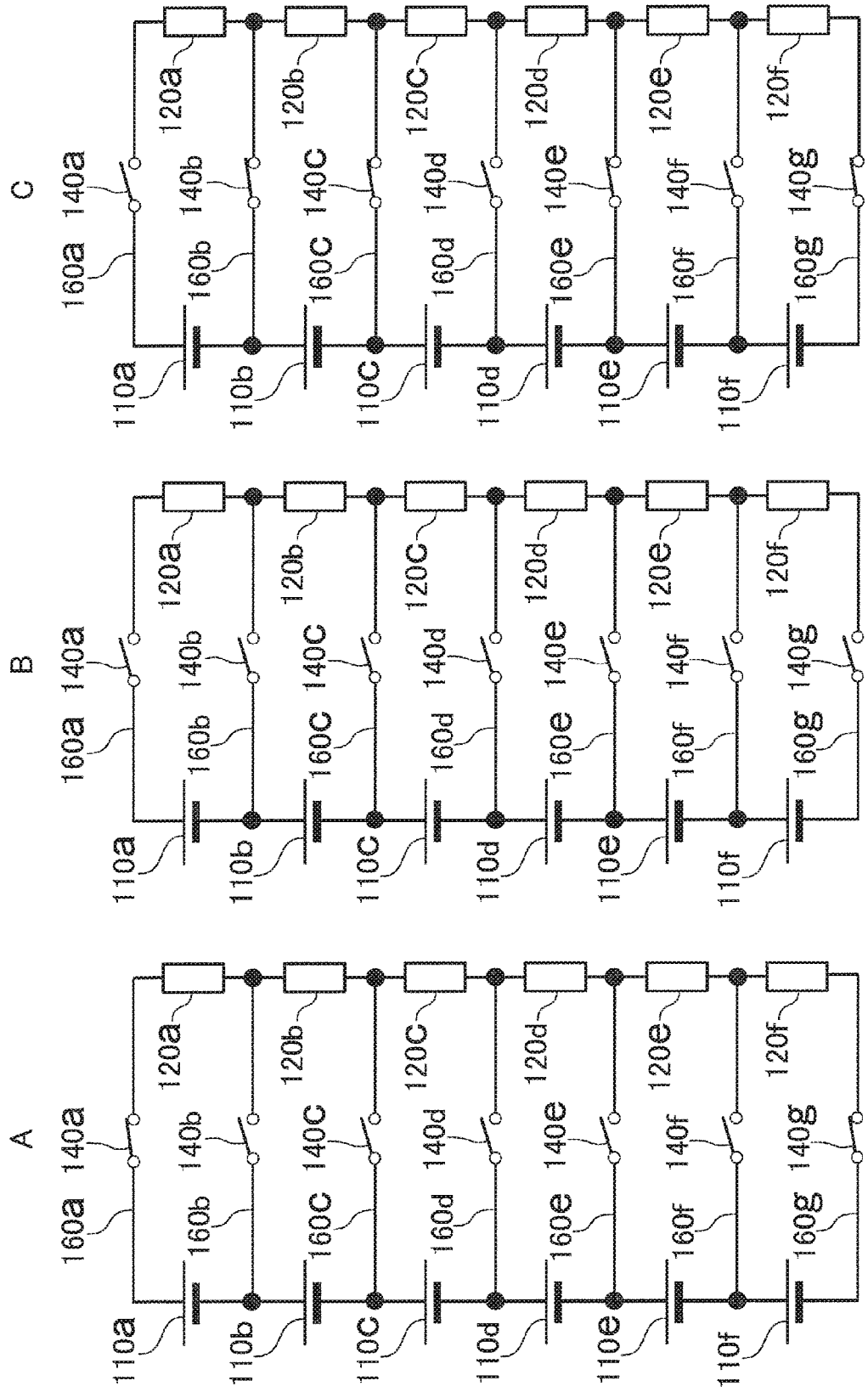
FIG. 6 is a diagram schematically showing an operation example of a power storage device of a first modified example of the second embodiment of the present disclosure, in which A shows a closed state of a first pair of connection lines, B shows an open state of the first pair of connection lines, and C shows a closed state of second pairs of connection lines.

A power storage device 100 of the present modified example has different content of control of a power storage control device 130 from the power storage device 100 described in FIG. 6.

Specifically, the power storage control device 130 of the present modified example has a configuration in which some cells among all cells are selected as a series of cells and a plurality of target cells are selected. In other words, the power storage control device 130 of the present modified example has a configuration of causing energy from some consecutive cells to move to some consecutive reactance elements, then opening a first pair of connection lines, and then closing a plurality of second pairs of connection lines. The case in which some cells are selected among all the cells as a series of cells may be a case in which a cell that is determined not to need a voltage equalizing process based on the voltage of the cell is excluded from the series of cells, or the like. More specifically, for example, a cell which is not between a cell with a maximum voltage and a cell having a minimum voltage may be excluded; however, such selection is not limited thereto.

[Device Operation Example]

An operation example of the power storage device 100 of the present modified example will be described below. The operation example below includes an embodiment of the power storage control method according to the present disclosure.

Figure 7:
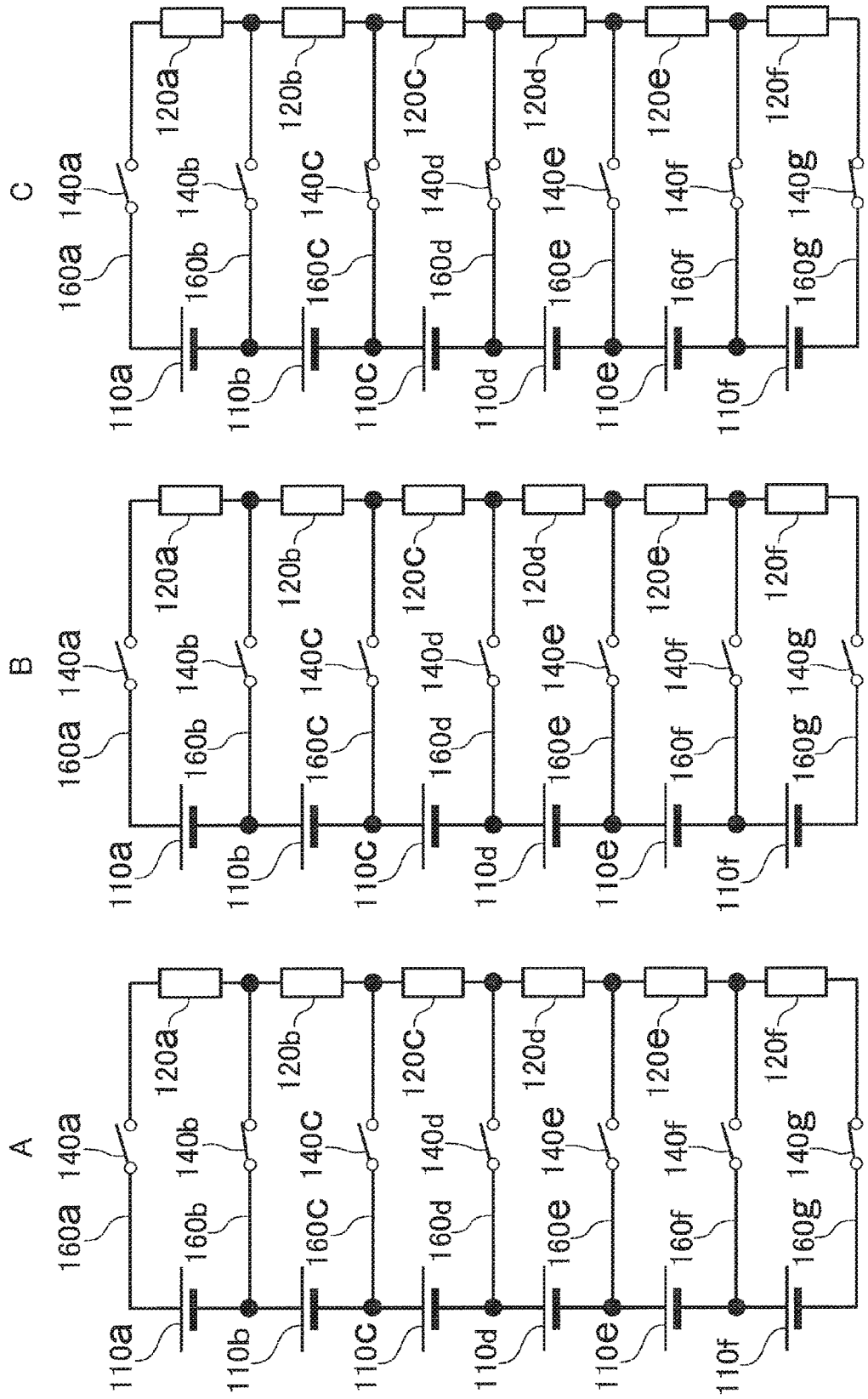
FIG. 7 is a diagram schematically showing an operation example of a power storage device of a second modified example of the second embodiment of the present disclosure, in which A shows a closed state of a first pair of connection lines, B shows an open state of the first pair of the connection lines, and C shows a closed state of second pairs of the connection lines.

In the present modified example, energy is transferred between a series of cells and a plurality of target cells when the power storage control device 130 controls the switching elements 140a to 140g to open and close the connection lines 160a to 160g as shown in FIGS. 7A to 7C.

Specifically, FIG. 7A shows a state in which a first pair of connection lines corresponding to some cells selected as a series of cells are closed. More specifically, the state of FIG. 7A is a state in which the second to sixth cells 110b to 110f are selected as the series of cells. In addition, the state of FIG. 7A is a state in which the second connection line 160b and the seventh connection line 160g are closed as the first pair of connection lines.

In the state of FIG. 7A, energy moves from the series of cells 110b to 110f to the second to sixth reactance elements 120b to 120f as a whole, and the moved energy is accumulated in each of the reactance elements 120b to 120f.

FIG. 7B shows an open state of the first pair of connection lines that were closed in FIG. 7A. In the state of FIG. 7B, the energy accumulated in the series of reactance elements 120b to 120f in the state of FIG. 7A remains accumulated in each of the reactance elements 120b to 120f.

FIG. 7C shows a closed state of the second pairs of connection lines. The state of FIG. 7C is a state in which the pair of the third connection line 160c and the fourth connection line 160d are closed as a second pair of connection lines. In addition, the state of FIG. 7C is a state in which the pair of the sixth connection line 160f and the seventh connection line 160g are also closed as another second pair of connection lines. In the state of FIG. 7C, the energy accumulated in the third reactance element 120c moves to the third cell 110c, and the energy accumulated in the sixth reactance element 120f moves to the sixth cell 110f.

However, the above-described operation is merely an aspect of the present modified example, and does not limit the scope of the present modified example. As a series of cells, for example, a series of cells excluding the cell closest to the negative electrode side or a series of cells excluding the cells closest to the positive electrode side and the negative electrode side may be selected.

According to the power storage device 100 of the present modified example, the same effect as that of the power storage device 100 of FIG. 6 can be exhibited, or a flexible voltage equalizing process with eased restriction on positions and the number of the series of cells is possible.

6. Third Embodiment

[Device Configuration Example]

Figure 8:
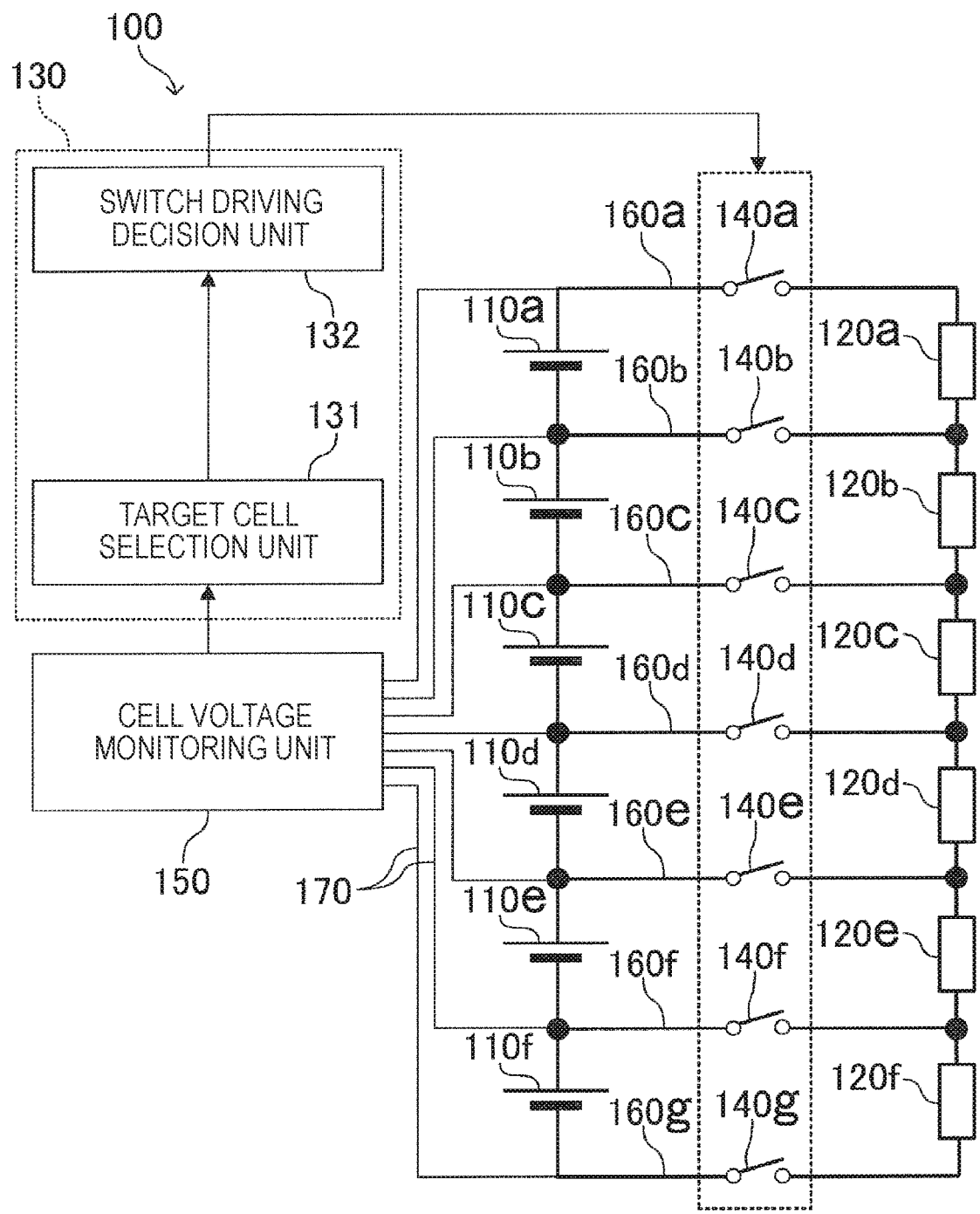
FIG. 8 is a diagram schematically showing a configuration example of a power storage device of a third embodiment of the present disclosure.

FIG. 8 is an overall diagram schematically showing a configuration example of the power storage device 100 of the present embodiment. The power storage control device 130 of the power storage device 100 of the present embodiment has a different configuration from that of the power storage device 100 of the second embodiment. In other words, the power storage control device 130 has a configuration in which a target cell is selected and then a first pair of connection lines is closed.

Specifically, the power storage device 100 includes a cell voltage monitoring unit 150 as shown in FIG. 8. In addition, the power storage control device 130 includes a target cell selection unit 131 and a switch driving decision unit 132 as shown in FIG. 8.

[Cell Voltage Monitoring Unit 150]

The cell voltage monitoring unit 150 is configured to monitor voltages of the cells 110a to 110f. The cell voltage monitoring unit 150 is configured to be connected to the positive electrodes and negative electrodes of the cells 110a to 110f and to monitor individual inter-terminal voltages of the cells 110a to 110f as shown in FIG. 8. The number of wires 170 connecting the cells 110a to 110f with the cell voltage monitoring unit 150 may be the same as the number of connection lines 160a to 160g as shown in FIG. 8.

The cell voltage monitoring unit 150 outputs the monitoring results of voltages of the cells 110a to 110f, i.e., detected cell voltages, to the power storage control device 130. The monitoring results may be output in a form in which the power storage control device 130 side can specify the cells 110a to 110f corresponding to the monitoring results. For example, the monitoring results may be output to input terminals of the power storage control device 130 for each of the cells 110a to 110f, or may be associated with identification information of the cells 110a to 110f.

An aspect of the cell voltage monitoring unit 150 is not limited, and various electronic devices which can monitor voltages of the cells 110a to 110f can be employed. Such an electronic device may include an integrated circuit or the like.

[Power Storage Control Device 130]

[Target Cell Selection unit 131]

The target cell selection unit 131 is configured to select a target cell. The target cell selection unit 131 receives an input of a monitoring result output from the cell voltage monitoring unit 150. The target cell selection unit 131 selects a target cell based on the monitoring result input from the cell voltage monitoring unit 150.

A criterion for selecting a target cell by the target cell selection unit 131 is not limited. For example, the target cell selection unit 131 may preferentially select a cell with a relatively small, in other words, low, cell voltage as a target cell. In addition, the target cell selection unit 131 may decide the number or position of a target cell according to the number or position of a cell with a low cell voltage.

[Switch Driving Decision Unit 132]

The switch driving decision unit 132 is configured to decide a driving method of the switching elements 140a to 140g, for example, allocation, the order, and the like of a turn-on operation or a turn-off operation of the switching elements 140a to 140g. In addition, the switch driving decision unit 132 is configured to drive the switching elements 140a to 140g according to the decided driving method of the switching elements 140a to 140g.

The switch driving decision unit 132 receives a target cell selection result of the target cell selection unit 131 to decide the driving method of the switching elements 140a to 140g. That is, the switch driving decision unit 132 is configured to switch switching elements corresponding to a series of cells, i.e., switching elements corresponding to a first pair of connection lines, to an on state after the target cell is selected. When deciding a driving method of the switching elements 140a to 140g, the switch driving decision unit 132 may determine which of the cells 110a to 110f should be selected as the series of cells. The determination may also be made based on a monitoring result of the cell voltage monitoring unit 150. When the switch driving decision unit 132 is configured to select all cells as a series of cells at all times, the switch driving decision unit 132 may not determine cells to be selected as a series of cells. The switch driving decision unit 132 may output a control signal to the switching elements 140a to 140g according to the decided driving method.

The target cell selection unit 131 and the switch driving decision unit 132 may be realized as hardware, software, or both.

[Device Operation Example]

Figure 9:
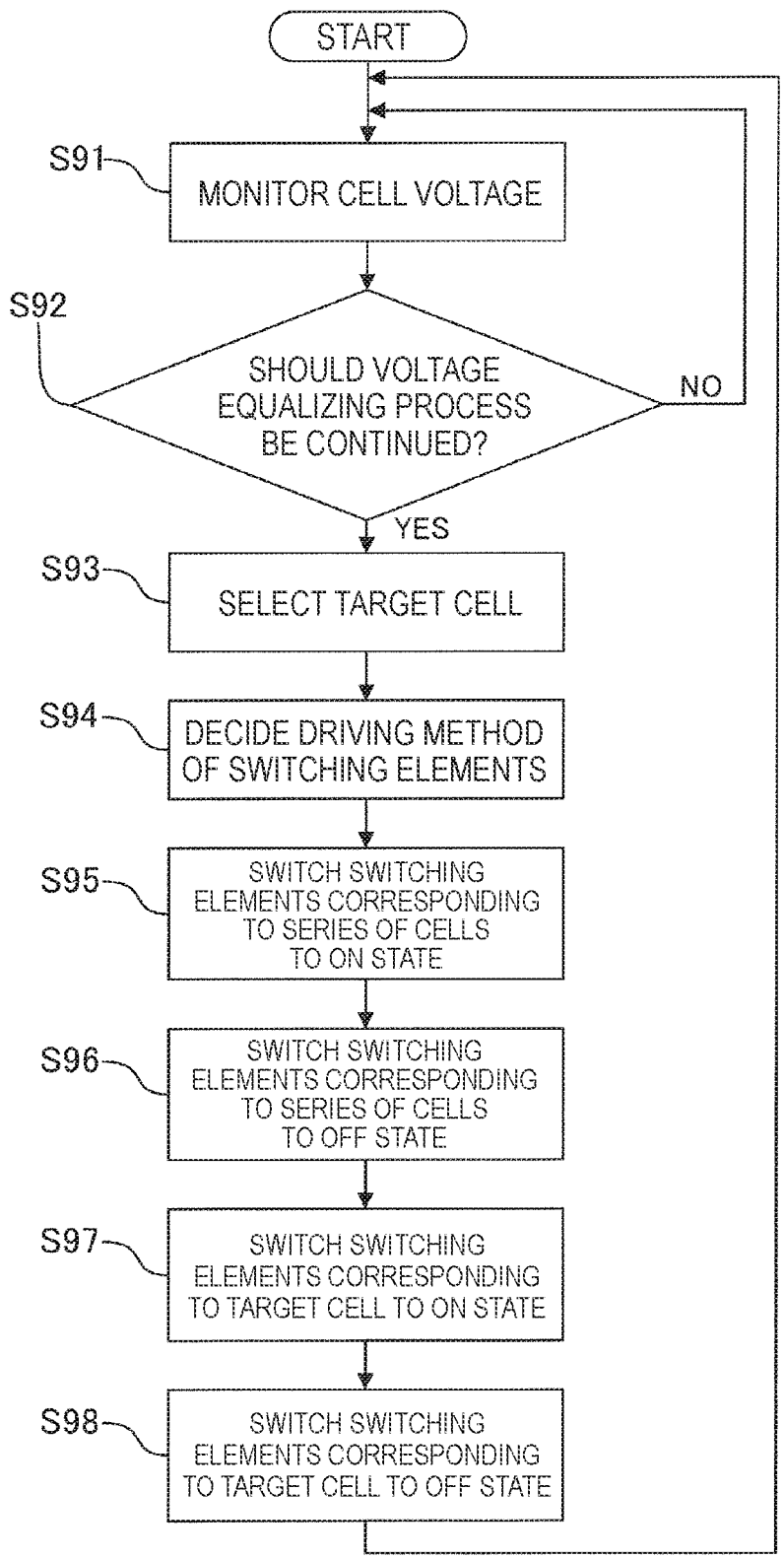
FIG. 9 is a flowchart showing an operation example of the power storage device of the third embodiment of the present disclosure.

FIG. 9 is a flowchart showing an operation example of the power storage device 100 of the present embodiment. The operation example shown in FIG. 9 includes an embodiment of the power storage control method according to the present disclosure.

For the sake of convenience in description, it is assumed in an initial state of FIG. 9 that the voltage equalizing process is not started and all the switching elements 140a to 140g are in an off state, in other words, all the cells 110a to 110f are disconnected from the reactance elements 120a to 120f.

Then, first in Step 91 (S91) of FIG. 9 from the initial state, the cell voltage monitoring unit 150 monitors cell voltages.

Then, in Step 92 (S92), the power storage control device 130 determines whether or not the voltage equalizing process should be continued based on the monitoring results of the cell voltages of Step 91 (S91). Then, when a positive determination result has been obtained in Step 92 (S92), the process proceeds to Step 93 (S93), and when a negative determination result has been obtained, the process returns to Step 91 (S91).

Then, in Step 93 (S93), the target cell selection unit 131 selects a target cell based on the monitoring results of the cell voltages of Step 91 (S91).

Then, in Step 94 (S94), the switch driving decision unit 132 decides a driving method of the switching elements 140a to 140g. This decision is based on the target cell selection result of Step 93 (S93).

Then, from Step 95 (S95), the switch driving decision unit 132 drives the switching elements 140a to 140g according to the driving method of the switching elements 140a to 140g decided in Step 94 (S94). Specifically, in Step 95 (S95), the first pair of connection lines are closed by switching the switching elements corresponding to a series of cells to the on state.

Then, in Step 96 (S96), by switching the switching elements corresponding to the series of cells that were switched to the on state in Step 95 (S95) to the off state, the first pair of connection lines are opened.

Then, in Step 97 (S97), by switching the switching elements corresponding to the target cell selected in Step 93 (S93) to the on state, a second pair of connection lines are closed.

Then, in Step 98 (S98), by switching the switching elements corresponding to the target cell that were switched to the on state in Step 97 (S97) to the off state, the second pair of connection lines are opened. Then, the process returns to Step 91 (S91).

According to the power storage device 100 of the present embodiment, the same effect as that of the power storage device 100 of the second embodiment can be exhibited. Alternatively, according to the present embodiment, in the configuration in which the switch driving decision unit 132 determines cells to be selected as a series of cells, the switch driving decision unit 132 can appropriately select a series of cells such that a target cell is included in the series of cells by selecting the target cell in advance.

Alternatively, according to the power storage device 100 of the present embodiment, by selecting a target cell in advance, switching to closing of the first pair of connection lines or to closing of the second pair of connection lines can be rapidly performed without waiting for selection of the target cell after opening of the first pair of connection lines. Securing continuity of opening and closing operations of the connection lines as above can also be linked to securing effectiveness of <11. First modified example of the fifth embodiment> to be described below.

7. First Modified Example of the Third Embodiment

[Device Configuration Example]

A power storage device 100 of the present modified example has a specified configuration for selecting a target cell in comparison to the power storage device 100 of FIG. 8.

Specifically, the power storage control device 130 of the present modified example is configured to cause a cell having a minimum voltage to be included in target cells. The target cell selection unit 131 of the present modified example is configured to detect the cell having the minimum voltage based on a monitoring result of the cell voltage monitoring unit 150. In addition, the target cell selection unit 131 of the present modified example is configured to select target cells including the cell having the minimum voltage.

Only a cell having a minimum voltage may be a target cell, or cells other than the cell having the minimum voltage may also be included in target cells. In addition to that, an aspect of selection of a target cell is not limited. For example, when there are a first cell having a minimum voltage and one or two or more second cells of which the potential difference from the first cell is within a predetermined value, the target cell selection unit 131 may select both the first cell and the second cells as target cells. In this case, the first cell and the second cells may be in a relation of adjacent positions, or in a relation of distant positions.

[Device Operation Example]

Figure 10:
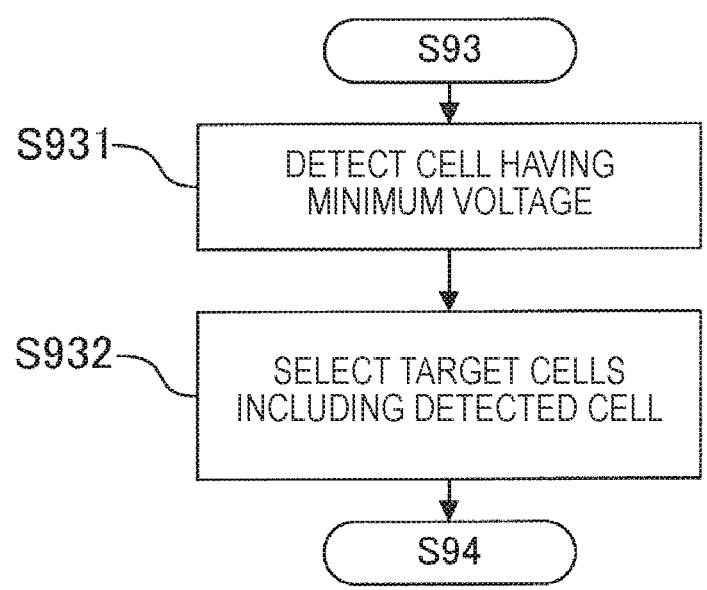
FIG. 10 is a flowchart showing an operation example of a power storage device of a first modified example of the third embodiment of the present disclosure.

FIG. 10 is a flowchart showing an operation example of the power storage device 100 of the present modified example. The operation example shown in FIG. 10 includes an embodiment of the power storage control method according to the present disclosure.

As shown in FIG. 10, Step 93 (S93) of FIG. 9 is realized by Step 931 (S931) and Step 932 (S932) in the present modified example.

Specifically, in Step 931 (S931), the target cell selection unit 131 detects a cell having a minimum voltage based on a monitoring result of the cell voltage monitoring unit 150.

In Step 932 (S932), the target cell selection unit 131 selects target cells including the cell having the minimum voltage detected in Step 931 (S931). After the target cells are selected, the process proceeds to Step 94 (S94).

According to the power storage device 100 of the present modified example, the same effect as that of the power storage device 100 of FIG. 8 can be exhibited, or by causing the cell having the minimum voltage to receive energy, a more efficient voltage equalizing process is possible.

8. Fourth Embodiment

[Device Configuration Example]

Figure 11:
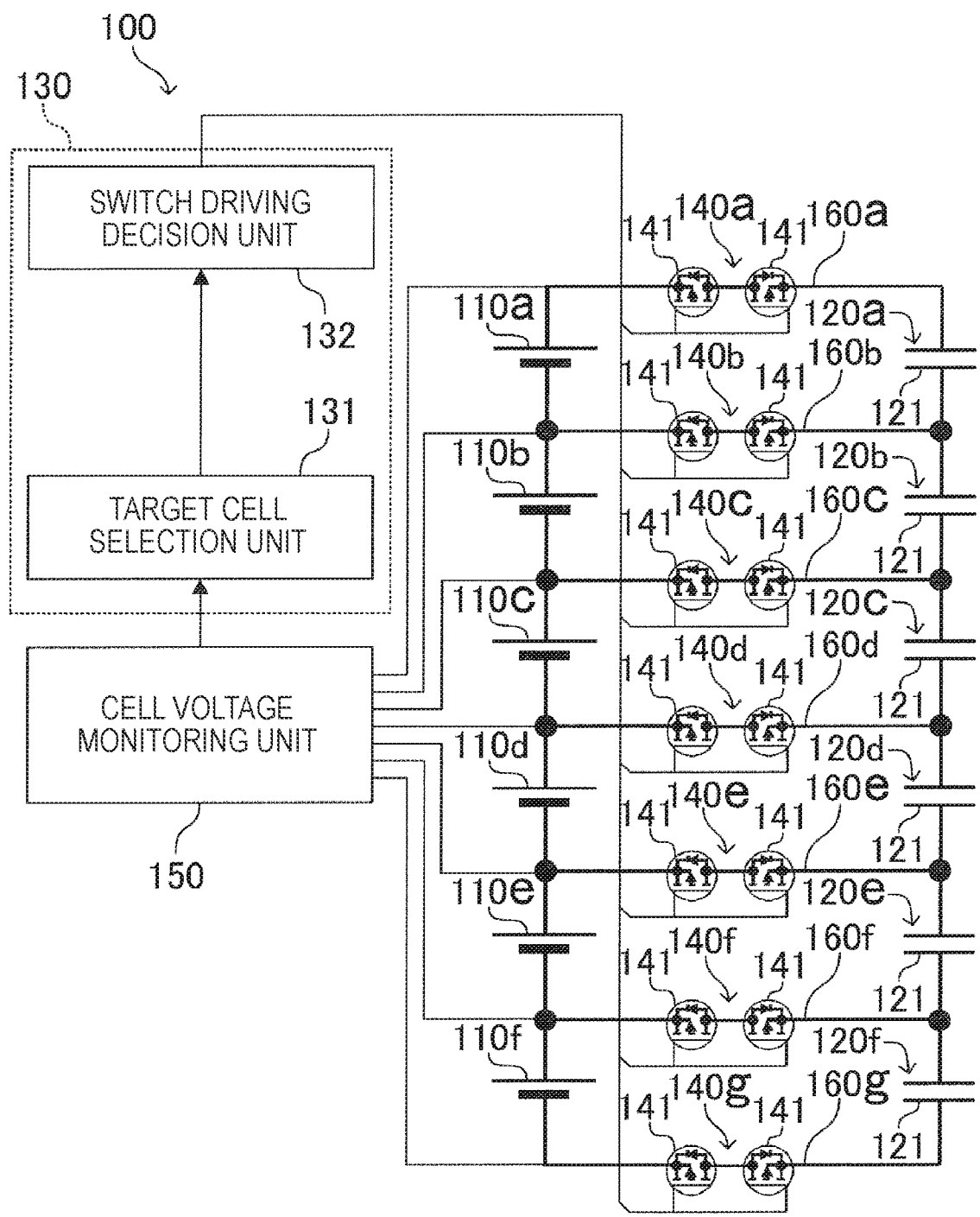
FIG. 11 is a diagram schematically showing a configuration example of a power storage device of a fourth embodiment of the present disclosure.

FIG. 11 is an overall diagram schematically showing a configuration example of the power storage device 100 of the present embodiment. The power storage device 100 of the present embodiment has a specified configuration of reactance elements and switching elements in comparison to the power storage devices 100 of the first to third embodiments. Details thereof will be described below.

[Reactance Elements 120a and 120b]

The reactance elements 120a to 120f of the present embodiment are capacitors 121. The reactance elements 120a to 120f accumulate energy moved from a series of cells as electric charge.

[Switching Elements 140a to 140g]

Each of the switching elements 140a to 140g is configured with a pair of MOSFETs 141 having parasitic diodes oppositely oriented to each other as shown in FIG. 11. Each of the MOSFETs 141 is connected to the switch driving decision unit 132, and is in an on state or an off state when a gate voltage, i.e., a gate-source voltage which is an example of a control signal from the switch driving decision unit 132, is applied thereto. The MOSFETs 141 constituting the same switching element are connected to each other in series. The drain electrodes of the MOSFETs 141 constituting the same switching element are connected to each other. With these configurations, it is possible to prevent the flow of a current caused by the parasitic diode and thus to exhibit a switching function with respect to a unidirectional current. The MOSFETs 141 are not limited to the P-channel type as shown in FIG. 11, and may be the n-channel type. In addition, the source electrodes of the MOSFETs 141 constituting the same switching element may be connected to each other.

[Device Operation Example]

In the power storage device 100 of the present embodiment, when the switch driving decision unit 132 supplies, for example, a gate voltage (absolute value) that is a gate threshold value voltage (absolute value) or higher to switching elements corresponding to a series of cells, the switching elements corresponding to the series of cells are switched to an on state. Accordingly, a current, i.e., a discharge current, flows from the series of cells to a series of reactance elements via a first pair of connection lines, and electric charge is accumulated in capacitors constituting each of the reactance elements. After energy moves from the series of cells to the series of reactance elements as described above, the switch driving decision unit 132 sets, for example, a gate voltage (absolute value) to a voltage lower than the gate threshold value voltage (absolute value), and thereby the switching elements corresponding to the series of cells are switched to an off state. Then, the switch driving decision unit 132 switches a switching element corresponding to a target cell to an on state. Accordingly, the electric charge accumulated in the reactance elements flows to the target cell as a current, i.e., a charge current, via a second pair of connection lines. As described above, energy moves to the target cell from the reactance element.

According to the power storage device 100 of the present embodiment, the same effect as that of the power storage devices 100 of the first to the third embodiments can be exhibited, or a voltage equalizing process in which a capability of preventing short-circuit of the cells 110a to 110f, i.e., safety, is improved with the capacitors is possible.

Figure 12:
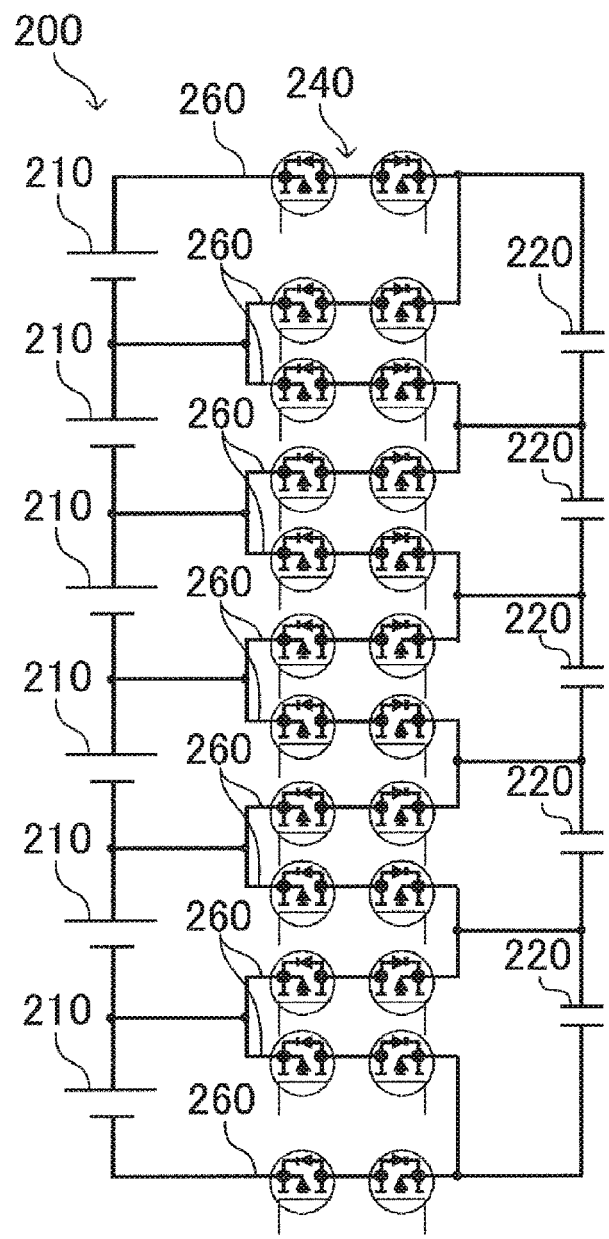
FIG. 12 is a diagram schematically showing a configuration of a power storage device of a first comparative example of the fourth embodiment of the present disclosure.
Figure 13:
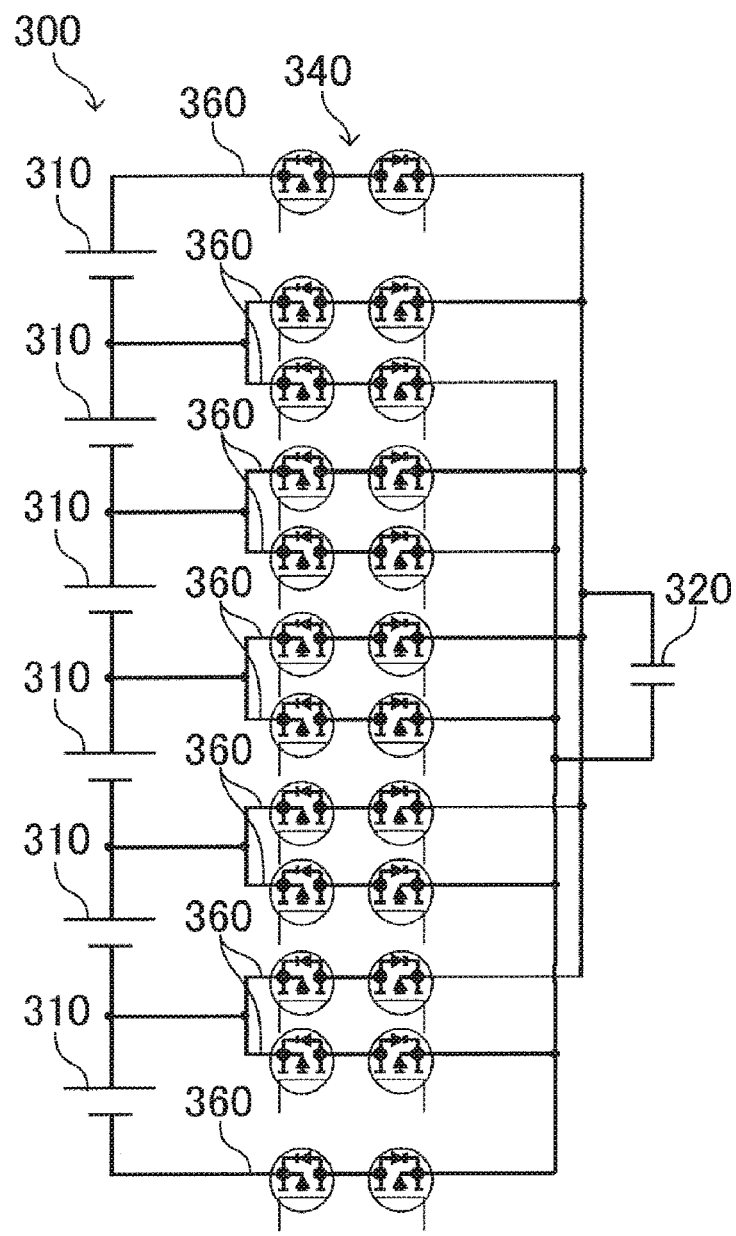
FIG. 13 is a diagram schematically showing a configuration of a power storage device of a second comparative example of the fourth embodiment of the present disclosure.

Next, comparative examples of power storage devices in which MOSFETs are applied to switching elements as in the present embodiment are shown in FIGS. 12 and 13. The power storage device 200 of the first comparative example shown in FIG. 12 is configured to cause energy to be transferred between adjacent cells 210 via capacitors 220. The power storage device 300 of the second comparative example shown in FIG. 13 is configured to cause energy to be transferred between arbitrary cells 310, regardless of their adjacency, via capacitors 320. As is understood from comparison of FIGS. 12 and 13 to FIG. 11, the power storage devices 200 and 300 of the comparative examples have an increased number of switching elements 240 and 340 in comparison to the power storage device 100 of the present embodiment. Specifically, while the number of switching elements 140a to 140g of the power storage device 100 of the present embodiment is 7, the number of switching elements 240 and 340 of the power storage devices 200 and 300 of the comparative examples is increased to 12. In addition, in the power storage devices 200 and 300 of the comparative examples, the number of connection lines 260 and 360 is also increased in comparison to the power storage device 100 of the present embodiment.

In other words, in the power storage device 100 of the present embodiment, the numbers of the switching elements 140a to 140g and the connection lines 160a to 160g are the number obtained by adding 1 to the number of cells 110a to 110f, and the number of switching elements and connection lines can be reduced more than in the comparative examples. Accordingly, costs can be cut more than in the comparative examples. In addition, according to the power storage device 100 of the present embodiment, the voltage equalizing process can be rapidly performed in comparison to a case in which transfer of energy between adjacent cells is repeated to perform the voltage equalizing process.

9. First Modified Example of the Fourth Embodiment

[Device Configuration Example]

A power storage device 100 of the present modified example has specific constants of reactance elements 160a to 160f in comparison to the power storage device 100 of FIG. 11.

Specifically, in the present modified example, a constant of each of the reactance elements 160a to 160f, i.e., electrostatic capacitance of the capacitors, is set to be the same.

[Device Operation Example]

Figure 14:
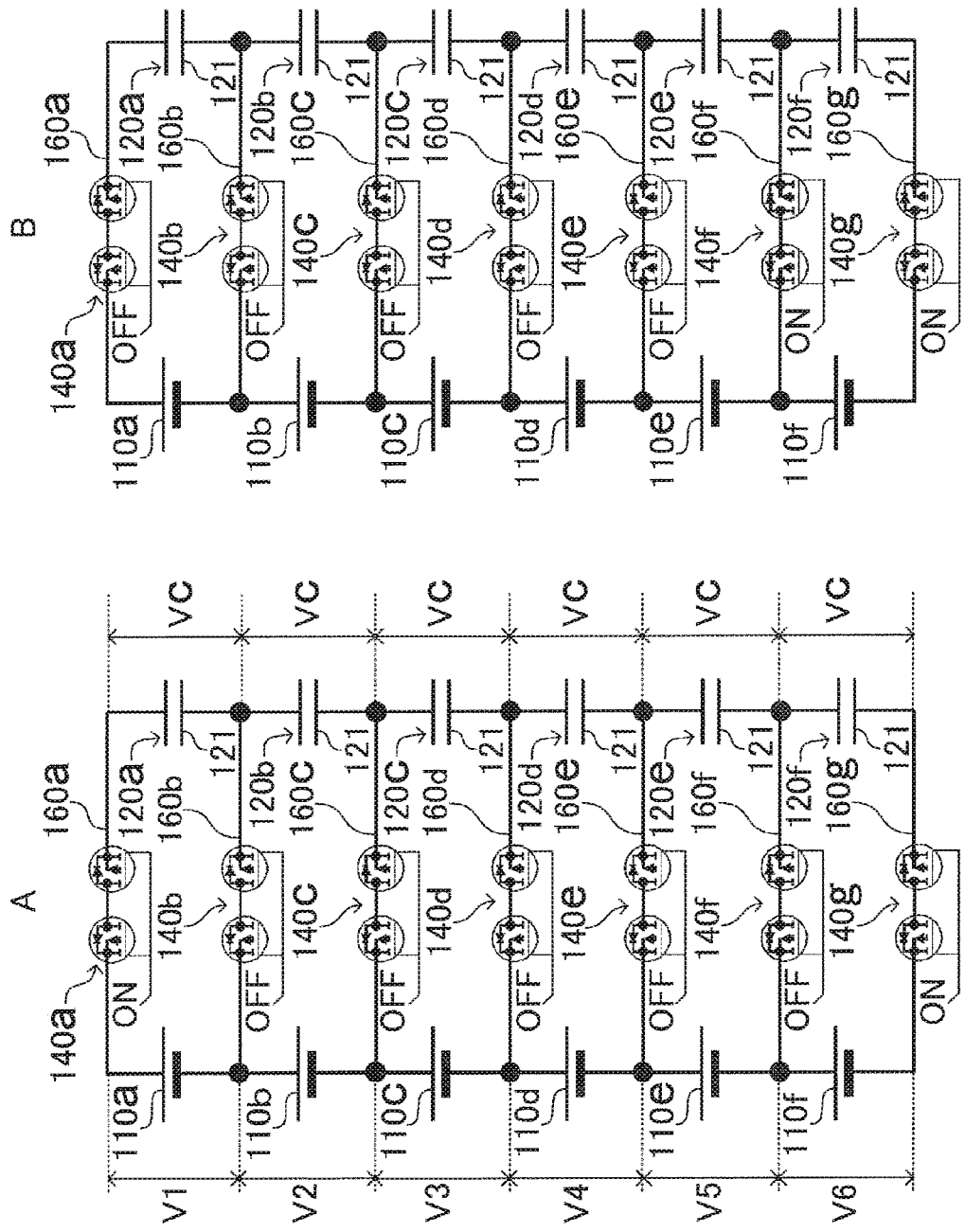
FIG. 14 is a diagram schematically showing an operation example of a power storage device of a first modified example of the fourth embodiment of the present disclosure, in which A shows a closed state of a first pair of connection lines, and B shows a closed state of a second pair of connection lines.

FIG. 14 schematically shows an operation example of the power storage device 100 of the present modified example. Specifically, FIG. 14A shows the first switching element 140a and the seventh switching element 140g in an on state. In other words, in FIG. 14A, the first connection line 160a and the seventh connection line 160g are shown to be in a closed state as a closed state of a first pair of connection lines. FIG. 14B shows the sixth switching element 140f and the seventh switching element 140g in an on state. In other words, in FIG. 14B, the sixth connection line 160f and the seventh connection line 160g are shown to be in a closed state as a closed state of a second pair of connection lines.

As shown in FIG. 14A, when voltages of the cells 110a to 110f are set to V1 to V6, the voltage Vc of each of the reactance elements 120a to 120f is (V1+V2+V3+V4+V5+V6)/6 as the constants of the reactance elements 120a to 120f are the same. In other words, the voltage of each of the reactance elements 120a to 120f is the average voltage of the cells 110a to 110f. In FIG. 14, V6<Vc is assumed.

As shown in FIG. 14B, when the sixth cell 110f with a lower voltage than the reactance elements 120a to 120f is connected to the sixth reactance element 120f, energy moves from the reactance element 120f to the cell 110f. At this time, the cell 110f to which energy moves may be a cell having a minimum voltage, or may be a cell other than the cell having the minimum voltage as long as the cell has a lower voltage than the reactance elements 120a to 120f.

According to the power storage device 100 of the present modified example, the same effect as that of the power storage device 100 of FIG. 11 can be exhibited, or an efficient voltage equalizing process can be made possible by causing average energy of cells to be transferred.

10. Fifth Embodiment

Figure 15:
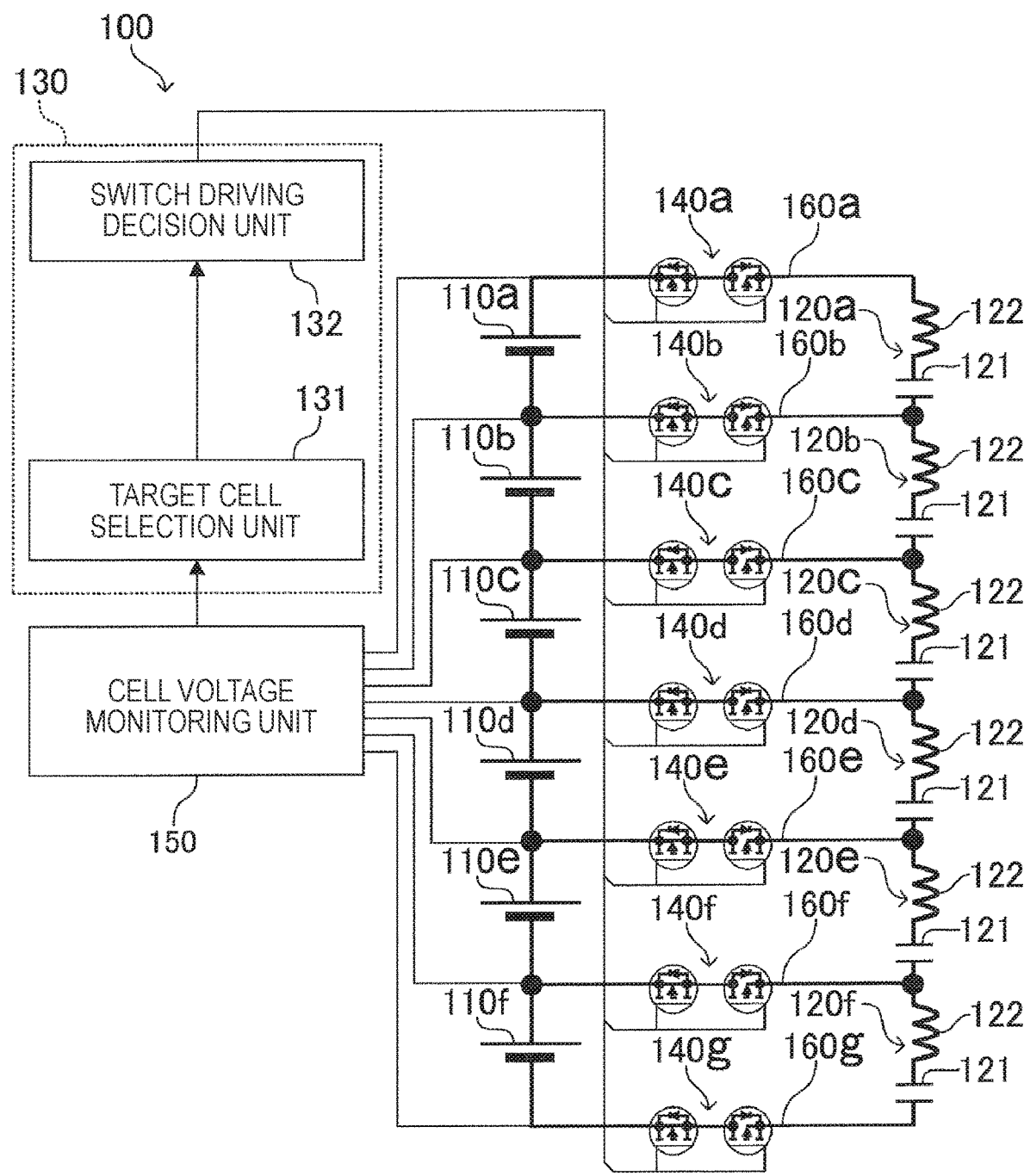
FIG. 15 is a diagram schematically showing a configuration example of a power storage device of a fifth embodiment of the present disclosure.

FIG. 15 is an overall diagram schematically showing a configuration example of the power storage device 100 of the present embodiment. The power storage device 100 of the present embodiment has a different configuration of reactance elements from the power storage device 100 of FIG. 11. Details thereof will be described below.

[Reactance Elements 120a and 120b]

Each of the reactance elements 120a to 120f according to the present embodiment is a capacitor 121 and a reactor 122, i.e., an inductor. The reactance elements 120a to 120f constitute an LC series resonance circuit. The power storage device 100 of the present embodiment is configured such that energy is accumulated in not only the capacitors 121 but also the reactors 122. The power storage device 100 of the present embodiment is configured to perform a voltage equalizing process using a resonance current generated due to a series resonance phenomenon of the reactance elements 120a to 120f.

[Device Operation Example]

In the power storage device 100 of the present embodiment, in a closed state of a first pair of connection lines, a resonance current, i.e., a discharge current, flows from a series of cells to a series of reactance elements, and thus energy moves to the series of reactance elements. When constants of the reactance elements 120a to 120f are the same, the energy that has moved to the series of reactance elements is evenly distributed to the series of reactance elements. In a closed state of a second pair of connection lines, a resonance current, i.e., a charge current, flows from the reactance elements to a target cell, and thus energy moves to the target cell.

Figure 16:
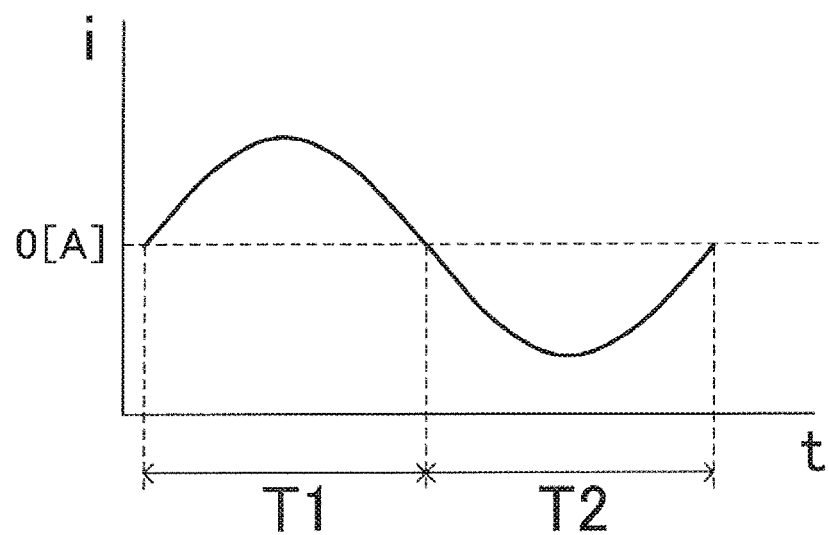
FIG. 16 is a time chart showing an operation example of the power storage device of the fifth embodiment of the present disclosure.

FIG. 16 schematically shows an example of a resonance current. The horizontal axis of FIG. 16 represents time t, and the vertical axis of FIG. 16 represents current values i of the resonance current. In FIG. 16, current values of a discharge current are set to be positive, and current values of a charge current are set to be negative. In a period T1 of FIG. 16, the first pair of connection lines are closed, and a discharge current which changes in time in a sine wave manner flows. In a period T2 of FIG. 16, a second pair of connection lines are closed and a charge current which changes in time in a sine wave manner flows.

According to the power storage device 100 of the present embodiment, the same effect as that of the power storage device 100 of FIG. 11 can be exhibited, or even when a potential difference between cells is small, energy can be rapidly transferred between cells via the reactors 122. Alternatively, according to the power storage device 100 of the present embodiment, energy can be efficiently transferred between cells using the series resonance phenomenon of the reactance elements.

11. First Modified Example of the Fifth Embodiment

[Device Configuration Example]

A power storage device 100 of the present modified example has a different configuration for switching connection of the cells 110*a* to 110*f* and the reactance elements 120*a* to 120*f* from the power storage device 100 of FIG. 15. Details thereof will be described below.

The power storage control device 130 of the present modified example is configured to switch connection of the reactance elements 120*a* to 120*f* and the cells 110*a* to 110*f* at a resonance frequency of the reactance elements 120*a* to 120*f*. In other words, the power storage control device 130 is configured to switch connection of a series of cells and a series of reactance elements and connection of a target cell and a reactance element corresponding to the target cell at a resonance frequency.

Here, when electrostatic capacitance of the capacitor 121 is set to C[F] and self-inductance of the reactor 122 is set to L[H], a resonance frequency of a reactance element is $1/\{2\pi(L \times C)^{1/2}\}$ [Hz]. When constants of the reactance elements 120*a* to 120*f*, i.e., L and C, are the same, the resonance frequency of a series of reactance elements connected to a series of cells is equal to the resonance frequency of the reactance element connected to a target cell. When the number of series connections of the series of reactance elements is set to n, the combined inductance is nL, and combined capacitance is C/n. Thus, the resonance frequency of the series of reactance elements is $1/\{2\pi(n \times L \times C/n)^{1/2}\}$, n is eliminated due to the product of n×L and C/n, and thus it is no difference from the resonance frequency of a single reactance element $1/\{2\pi(L \times C)^{1/2}\}$.

When a period for which cells are connected to and then disconnected from reactance elements is defined as a connection switch period Sc, the connection switch period Sc is $\pi(L \times C)^{1/2}$ [s]. The power storage control device 130 of the present modified example can also be said to be configured to switch connection of the reactance elements and the cells in each connection switch period Sc.

The power storage control device 130 may be configured to operate by storing information of resonance frequencies and connection switch periods Sc and calculating a switching timing of connection based on the stored information.

[Device Operation Example]

Figure 17:
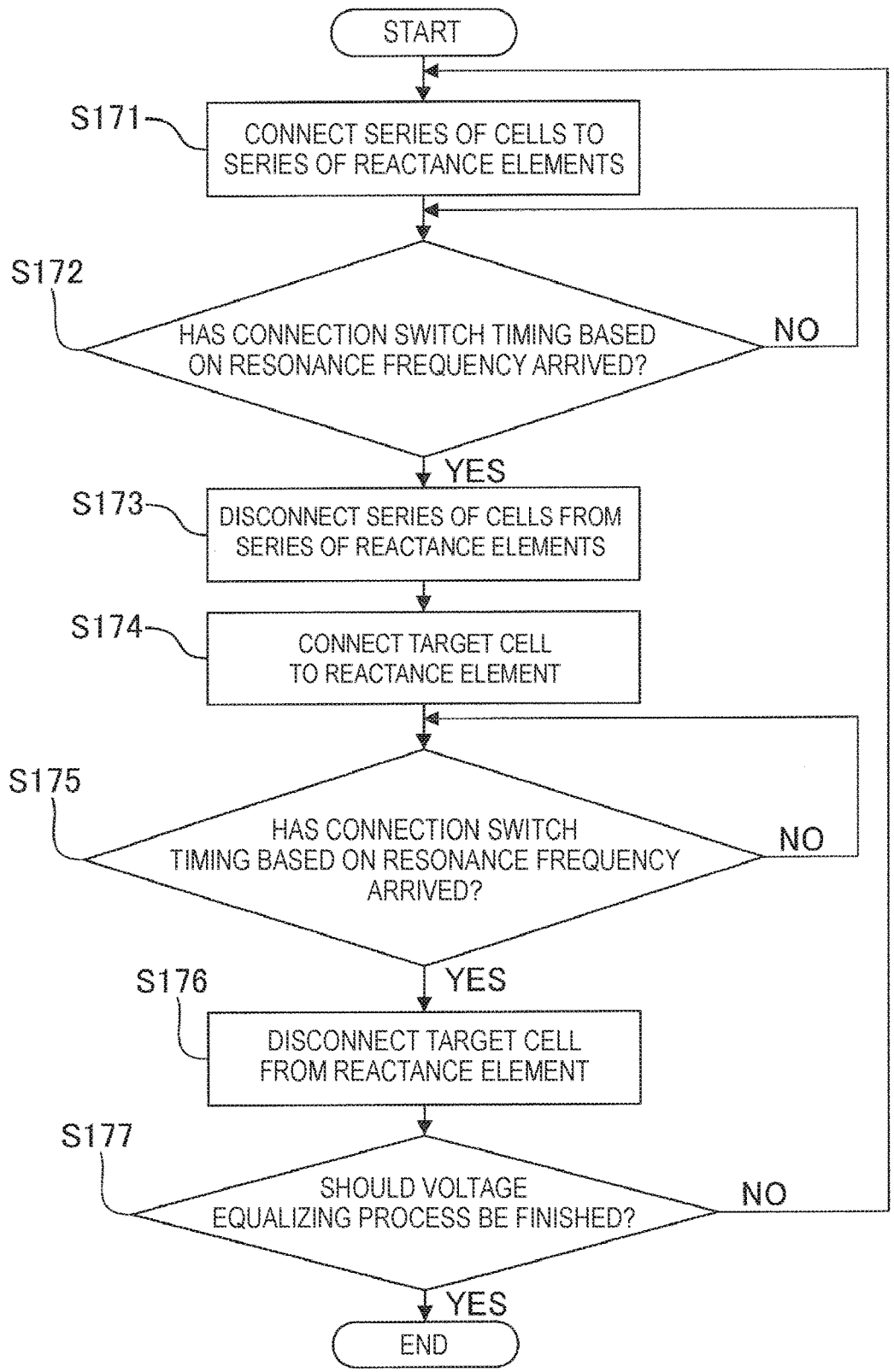
FIG. 17 is a flowchart showing an operation example of a power storage device of a first modified example of the fifth embodiment of the present disclosure.

FIG. 17 is a flowchart showing an operation example of the power storage device 100 of the present modified example. In FIG. 17, first in Step 171 (S171), the power storage control device 130 causes the series of cells to be connected to the series of reactance elements.

Next, in Step 172 (S172), the power storage control device 130 determines whether or not a connection switch timing based on the resonance frequency of the reactance elements has arrived. Then, when a positive determination result is obtained in Step 172 (S172), the process proceeds to Step 173 (S173), and when a negative determination result is obtained, Step 172 (S172) is repeated.

Then, in Step 173 (S173), the power storage control device 130 causes the series of cells to be disconnected from the series of reactance elements.

Then, in Step 174 (S174), the power storage control device 130 causes a target cell to be connected to the reactance element corresponding thereto.

Then, in Step 175 (S175), the power storage control device 130 determines whether or not a connection switch timing based on the resonance frequency of the reactance elements has arrived. Then, when a positive determination result is obtained in Step 175 (S175), the process proceeds to Step 176 (S176), and when a negative determination result is obtained, Step 175 (S175) is repeated.

Then, in Step 176 (S176), the power storage control device 130 causes the target cell to be disconnected from the reactance element.

Then, in Step 177 (S177), the power storage control device 130 finishes this voltage equalizing process when the process should be finished, and returns to Step 171 (S171) when the voltage equalizing process is to be continued. The determination of whether to finish the voltage equalizing process may be performed before Step 177 (S177). When the process returns to Step 171 (S171), a target cell, a series of cells, or both may be selected again based on a monitoring result of a cell voltage or the like.

According to the power storage device 100 of the present modified example, the same effect as that of the power storage device 100 of FIG. 15 can be exhibited, or connection of cells can be switched at a proper timing for transfer of energy.

12. Second Modified Example of the Fifth Embodiment

A power storage device 100 of the present modified example has specified cells in comparison to the power storage device 100 of FIG. 15.

Specifically, the cells of the present modified example are cells having a substantially flat discharge characteristic.

Figure 18:
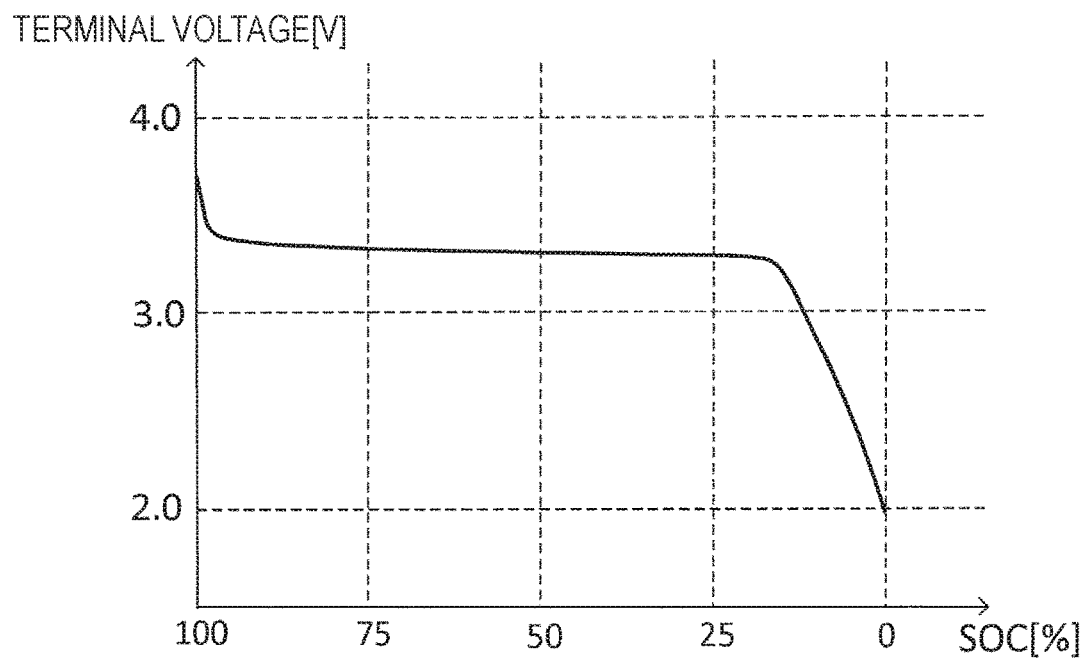
FIG. 18 is a discharge curve diagram of cells for describing a configuration example of a power storage device of a second modified example of the fifth embodiment of the present disclosure.

As an example of the substantially flat discharge characteristic, a discharge curve obtained when a lithium ion secondary battery of which a material of the positive electrode is olivine-type iron phosphate is discharged at 1C is shown in FIG. 18. With respect to the discharge curve of FIG. 18, the horizontal axis represents SOC [%] as an example of a discharge ratio, and the vertical axis represents terminal voltages [V] of cells. In the discharge curve of FIG. 18, a change of voltage is 0.25 V or lower in a series of sections spanning 50% or more of the section of the discharge ratio of 0% to 100%. More specifically, the discharge curve of FIG. 18 shows a change of voltage of about 0.1 V in the section of the discharge ratio of 20% to 90%. Although the discharge curve of FIG. 18 shows a significant voltage drop attributable to internal resistance immediately after the start of discharge, it continuously shows a flat characteristic thereafter, and thus unevenness in voltage within a battery pack configured in serial connection becomes small. The cells are not limited to lithium ion secondary batteries that use olivine-type iron phosphate.

Here, the power storage device 100 has relatively even temperature distribution therein and a load current fluctuates little in comparison to an automobile or the like, and thus unevenness of voltages between cells is small. Therefore, in the power storage device 100, it is desirable in the voltage equalizing process to secure cell balance with a low current without waste, rather than rapidly resolving unevenness of voltages between cells using a high current. If cells having such a flat discharge characteristic as in the present modified example are applied, the voltage equalizing process at a low current by which a load to the cells is reduced can be rapidly performed with an LC series resonance circuit. Use of cells having the substantially flat discharge characteristic is not limited to the case in which reactance elements constitute an LC series resonance circuit.

13. Sixth Embodiment

The power storage device 100 of the present embodiment shows a different resonance frequency of reactance elements from the power storage devices 100 of the first to fifth embodiments.

Specifically, the resonance frequency of the reactance elements according to the present embodiment is a frequency when an imaginary number component in a Cole-Cole plot of internal impedance of cells measured using an AC impedance method is 0.

Here, in the AC impedance method, the internal impedance of each frequency is measured while a frequency is changed by applying an alternate current to cells. The Cole-Cole plot is one method for illustrating a measurement result of the AC impedance method. In the Cole-Cole plot, the internal impedance of cells for each frequency obtained using the AC impedance method is plotted on a complex plane whose horizontal axis represents real number components of internal impedance and whose vertical axis represents imaginary number components of the internal impedance.

Figure 19:
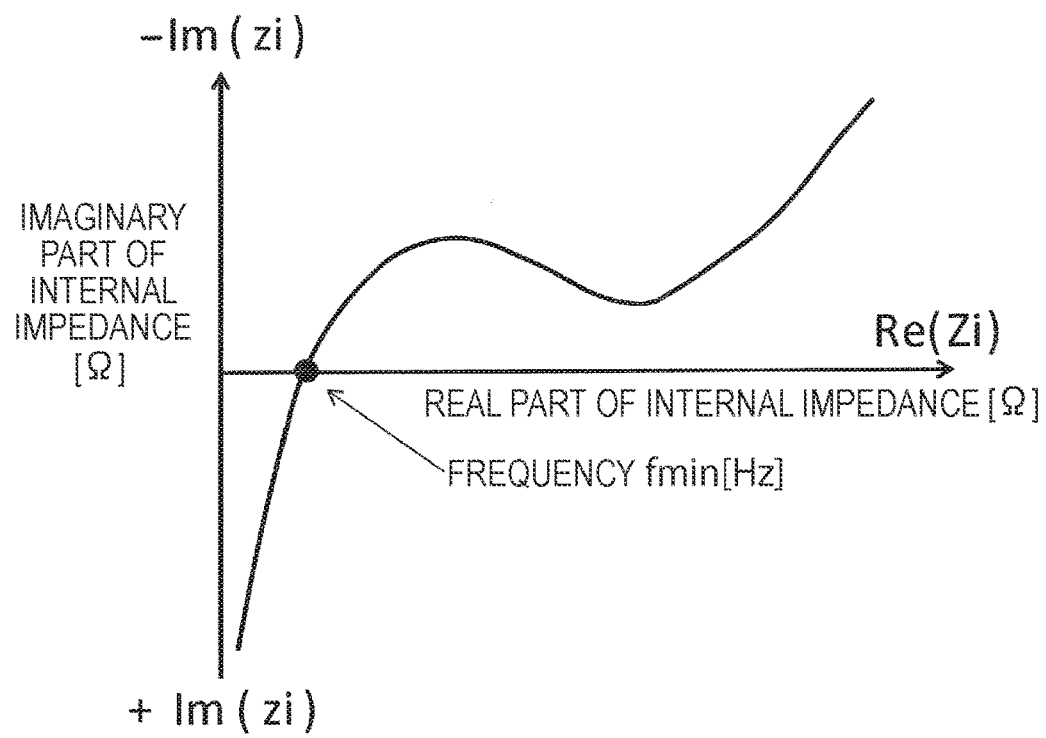
FIG. 19 is a diagram of a Cole-Cole plot for describing a configuration example of a power storage device of a sixth embodiment of the present disclosure.

An example of the Cole-Cole plot is shown in FIG. 19. In FIG. 19, the frequency when an imaginary number component of the internal impedance is 0 is set to fmin [Hz]. In this case, reactance elements may be designed to cause fmin to be a resonance frequency. Specifically, a self-inductance L of the reactor 122 and the electrostatic capacitance C of the capacitor 121 may be selected to satisfy $fmin=1/\{2\pi\times(L\times C)^{1/2}\}$.

According to the power storage device 100 of the present embodiment, the same effect as the power storage devices 100 of the first to fifth embodiments can be exhibited, or energy can be more efficiently transferred by minimizing the internal impedance of the cells.

14. First Modified Example of the Sixth Embodiment

A power storage device 100 of the present modified example has a different setting of a resonance frequency of reactance elements from the power storage device 100 described with reference to FIG. 19.

Figure 20:
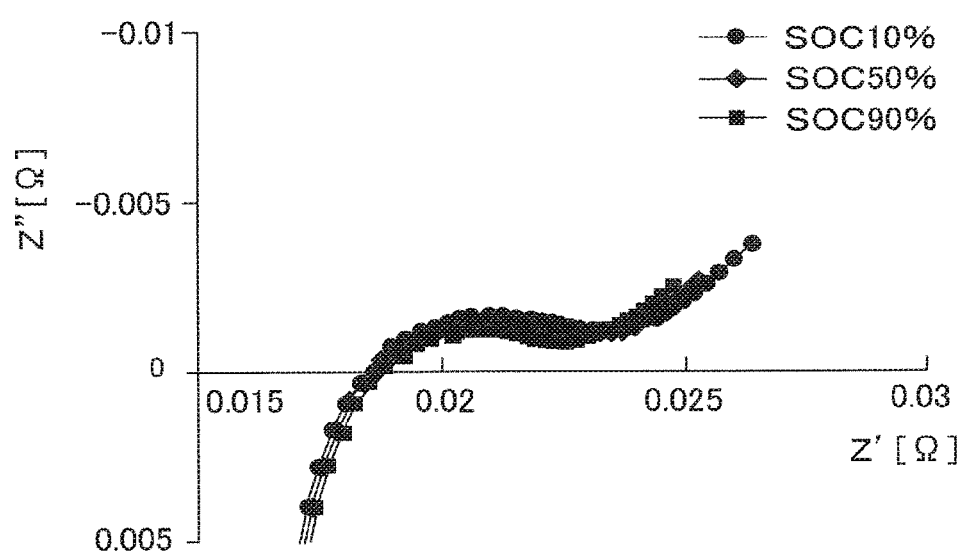
FIG. 20 is a diagram of Cole-Cole plots for describing a configuration example of a power storage device of a first modified example of the sixth embodiment of the present disclosure.

Examples of Cole-Cole plots for describing the power storage device 100 of the present modified example are schematically shown in FIG. 20. The horizontal axis Z' of FIG. 20 represents the real part of internal impedance of cells and the vertical axis Z" of FIG. 20 represents the imaginary part of the internal impedance of the cells. In FIG. 20, the Cole-Cole plots of respective states of charge (SOC) [%] are shown as examples of charge ratios of cells. The Cole-Cole plots of FIG. 20 are plots based on measurement results of the internal impedance of the cells by a frequency response analyzer (FRA). Specific numerical values in FIG. 20 are merely examples, and do not limit the scope of the present disclosure.

As shown in FIG. 20, a Cole-Cole plot may be different according to SOC. When the frequency fmin when the imaginary number component in the Cole-Cole plot is 0 is different according to SOC, fmin is obtained for each SOC and a resonance frequency of reactance elements may be set comprehensively taking obtained fmin of each SOC into consideration. For example, the reactance elements may be designed such that the average value of fmin of the SOC is obtained and the average value is set to the resonance frequency.

According to the present modified example, energy can be efficiently transferred in consideration of a changing SOC.

The above-described embodiments and modified examples may be appropriately combined.

Effects described in the embodiments and modified examples are merely illustrative and are not limitative, and other effects may be exhibited. The present disclosure may exhibit any one of a plurality of effects described in the embodiments and modified examples.

Additionally, the present technology may also be configured as below.

(1)

A power storage device including:

a plurality of cells which are connected in series;

a plurality of reactance elements which are connected in series;

a plurality of connection lines configured to connect the respective cells and the respective reactance elements in parallel in a one-to-one correspondence;

a plurality of switching elements configured to independently open and close each of the connection lines; and a power storage control device configured to control the switching elements to cause energy to be transferred between the cells.

(2)

The power storage device according to (1), wherein the power storage control device is configured to close a first pair of connection lines which are disposed at both ends of a selected series of cells among the plurality of cells, and then open the first pair of connection lines and close a second pair of connection lines which are disposed at both ends of a target cell among the series of cells.

(3)

The power storage device according to (2), wherein the power storage control device is configured to select all or some of the plurality of cells as the series of cells and select a plurality of target cells.

(4)

The power storage device according to any of (1) to (3), wherein each of the reactance elements has a same constant.

(5)

The power storage device according to any of (1) to (4), wherein each of the reactance elements includes a capacitor.

(6)

The power storage device according to (5), wherein each of the reactance elements includes a reactor.

(7)

The power storage device according to (6), wherein the power storage control device is configured to switch connection of the reactance elements and the cells at a resonance frequency of the reactance elements.

(8)

The power storage device according to any of (1) to (7), wherein a resonance frequency of the reactance elements is a frequency when an imaginary number component in a Cole-Cole plot of internal impedances of the cells measured using an AC impedance method is 0.

(9)

The power storage device according to any of (1) to (8), wherein the number of switching elements and the number of connection lines are a number obtained by adding 1 to the number of cells.

(10)

The power storage device according to (2), wherein the power storage control device is configured to select the target cell and then to close the first pair of connection lines.

(11)

The power storage device according to (10), wherein the power storage control device is configured to select the target cell including a cell having a minimum voltage.

(12)

A power storage control program causing a computer to functions as a mechanism configured to control a plurality of switching elements to independently open and close a plurality of connection lines which connect a plurality of cells connected in series and a plurality of reactance elements connected in series in parallel in a one-to-one correspondence to cause energy to be transferred between the cells.

REFERENCE SIGNS LIST 100 power storage device
110a, 110b cell
120a, 120b reactance element
130 power storage control device
140a, 140b, 140c switching element
160a, 160b, 160c connection line

The invention claimed is:

1. A power storage device, comprising:
   a plurality of cells connected in series, wherein each cell of the plurality of cells is a battery cell which charges with a charge current and discharges a discharge current;
   a plurality of reactance elements connected in series;
   a plurality of connection lines configured to connect respective cells of the plurality of cells and respective reactance elements of the plurality of reactance elements in parallel in a one-to-one correspondence;
   a plurality of switching elements configured to independently open or close each of the plurality of connection lines; and
   a power storage control device configured to:
      control the plurality of switching elements to transfer energy between the plurality of cells;
      close a first pair of connection lines of the plurality of connection lines,
         wherein the first pair of connection lines are at ends of a series of cells, and the series of cells is among the plurality of cells,
      open, subsequent to the close of the first pair of connection lines, the first pair of connection lines, and
      close, subsequent to the open of the first pair of connection lines, a second pair of connection lines of the plurality of connection lines,
         wherein the second pair of connection lines are at ends of a target cell, and the target cell is among the series of cells.

2. The power storage device according to claim 1, wherein the power storage control device is further configured to:
   select at least two of the plurality of cells as the series of cells; and
   select a plurality of target cells from the series of cells.

3. The power storage device according to claim 1, wherein each of the plurality of reactance elements has a same constant.

4. The power storage device according to claim 3, wherein each of the plurality of reactance elements includes a capacitor.

5. The power storage device according to claim 4, wherein each of the plurality of reactance elements includes a reactor.

6. The power storage device according to claim 5, wherein the power storage control device is further configured to switch a connection of the plurality of reactance elements and the plurality of cells at a resonance frequency of the plurality of reactance elements.

7. The power storage device according to claim 1, wherein a resonance frequency of the plurality of reactance elements corresponds to an imaginary number component with a value of 0 in a Cole-Cole plot of a plurality of internal impedances,
   wherein the plurality of internal impedances are associated with the plurality of cells, and are measured based on an AC impedance method.

8. The power storage device according to claim 1, wherein a number of the plurality of switching elements and a number of the plurality of connection lines are obtained by addition of 1 to a number of the plurality of cells.

9. The power storage device according to claim 1, wherein the power storage control device is further configured to:
   select the target cell; and
   close the first pair of connection lines, subsequent to the selection of the target cell.

10. The power storage device according to claim 9, wherein the power storage control device is further configured to select the target cell, wherein the target cell has a minimum voltage among the plurality of cells.

11. The power storage device according to claim 1, wherein a switching element of the plurality of switching elements is a transistor.

12. A power storage control device, comprising:
   a circuitry configured to:
      control a plurality of switching elements to independently open or close a plurality of connection lines,
         wherein the plurality of connection lines connect a plurality of cells and a plurality of reactance elements in parallel in a one-to-one correspondence,
         wherein the plurality of cells are connected in series,
         wherein the plurality of reactance elements are connected in series, and
         wherein each cell of the plurality of cells is a battery cell which charges with a charge current and discharges with a discharge current;
      transfer energy between the plurality of cells based on the control of the plurality of switching elements;

close a first pair of connection lines of the plurality of connection lines,
  wherein the first pair of connection lines are at ends of a series of cells, and the series of cells is among the plurality of cells;
open, subsequent to the close of the first pair of connection lines, the first pair of connection lines; and
close, subsequent to the open of the first pair of connection lines, a second pair of connection lines of the plurality of connection lines,
  wherein the second pair of connection lines are at ends of a target cell, and the target cell is among the series of cells.

13. A power storage control method, comprising:
in a control device:
  controlling a plurality of switching elements to independently open or close a plurality of connection lines,
    wherein the plurality of connection lines connect a plurality of cells and a plurality of reactance elements in parallel in a one-to-one correspondence,
    wherein the plurality of cells are connected in series,
    wherein the plurality of reactance elements are connected in series, and
    wherein each cell of the plurality of cells is a battery cell which charges with a charge current and discharges with a discharge current;
  transferring energy between the plurality of cells based on the controlling of the plurality of switching elements;
  closing a first pair of connection lines of the plurality of connection lines,
    wherein the first pair of connection lines are at ends of a series of cells, and the series of cells is among the plurality of cells;
  opening, subsequent to the closing of the first pair of connection lines, the first pair of connection lines; and
  closing, subsequent to the opening of the first pair of connection lines, a second pair of connection lines of the plurality of connection lines,
  wherein the second pair of connection lines are at ends of a target cell, and the target cell is among the series of cells.

* * * * *